(12) United States Patent
Lee

(10) Patent No.: US 12,718,596 B2
(45) Date of Patent: Aug. 25, 2026

(54) METHOD AND DEVICE FOR PROVIDING INFORMATION ABOUT IoT DEVICE AVAILABLE IN USER INDOOR AREA

(71) Applicant: SAMSUNG ELECTRONICS CO., LTD., Suwon-si (KR)

(72) Inventor: Hyungdong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 18/414,991

(22) Filed: Jan. 17, 2024

(65) Prior Publication Data

US 2024/0242516 A1 Jul. 18, 2024

Related U.S. Application Data

(63) Continuation of application No. PCT/KR2023/019513, filed on Nov. 30, 2023.

(30) Foreign Application Priority Data

Jan. 17, 2023 (KR) ........................ 10-2023-0006996
Jan. 31, 2023 (KR) ........................ 10-2023-0013180

(51) Int. Cl.
*G06K 9/00* (2022.01)
*G06T 7/70* (2017.01)
(Continued)

(52) U.S. Cl.
CPC ................ *G06V 20/60* (2022.01); *G06T 7/70* (2017.01); *G06V 10/54* (2022.01); *G06V 10/56* (2022.01);
(Continued)

(58) Field of Classification Search
None
See application file for complete search history.

(56) References Cited

U.S. PATENT DOCUMENTS 9,400,943 B2 7/2016 Sharma et al.
10,185,934 B2 1/2019 Gupta
(Continued)

FOREIGN PATENT DOCUMENTS

CN 109407527 A 3/2019
CN 109856980 A 6/2019
(Continued)

OTHER PUBLICATIONS

International Search Report (PCT/ISA/210) and Written Opinion (PCT/ISA/237) issued by the International Searching Authority on Mar. 5, 2023 in corresponding International Application No. PCT/KR2023/019513.

(Continued)

*Primary Examiner* — Wei Wen Yang
(74) *Attorney, Agent, or Firm* — Sughrue Mion, PLLC

(57) ABSTRACT

A method of providing information about an Internet-of-Things (IoT) device available in an indoor area, includes: identifying an object in a captured image of the indoor area; identifying a feature of the object based on the captured image, the feature being related to at least one operation method of the object or a configuration of the object; determining an IoT device corresponding to the object, based on a type of the object and the feature of the object; and providing information about the determined IoT device.

11 Claims, 21 Drawing Sheets

(51) Int. Cl.

| | |
|---|---|
| ***G06V 10/54*** | (2022.01) |
| ***G06V 10/56*** | (2022.01) |
| ***G06V 10/82*** | (2022.01) |
| ***G06V 20/60*** | (2022.01) |

(52) U.S. Cl.

CPC .... *G06V 10/82* (2022.01); *G06T 2207/20084* (2013.01)

(56) References Cited

U.S. PATENT DOCUMENTS

| | | | | |
|---|---|---|---|---|
| 11,644,964 | B2 | 5/2023 | Ni | |
| 2015/0019342 | A1 | 1/2015 | Gupta | |
| 2015/0036881 | A1 | 2/2015 | Sharma et al. | |
| 2021/0089040 | A1* | 3/2021 | Ebrahimi Afrouzi | G05D 1/0248 |
| 2022/0189108 | A1* | 6/2022 | Shandilya | G06N 3/0455 |

FOREIGN PATENT DOCUMENTS

| | | | | |
|---|---|---|---|---|
| CN | 110490688 | A | 11/2019 | |
| CN | 111696198 | A | 9/2020 | |
| CN | 113127729 | A | 7/2021 | |
| KR | 10-2016-0039204 | A | 4/2016 | |
| KR | 10-1753232 | B1 | 7/2017 | |
| KR | 10-2017-0112847 | A | 10/2017 | |
| KR | 10-2018-0013570 | A | 2/2018 | |
| KR | 10-2021-0006826 | A | 1/2021 | |
| KR | 10-2021-0010522 | A | 1/2021 | |
| KR | 10-2021-0048385 | A | 5/2021 | |
| WO | WO-2023154065 | A1 * | 8/2023 | G06V 10/82 |

OTHER PUBLICATIONS

Communication dated May 15, 2025, issued by European Patent Office in European Patent Application No. 23917885.8.

Communication dated Sep. 18, 2025, issued by European Patent Office in European Patent Application No. 23917885.8.

* cited by examiner 110
100
110
120
DETECT OBJECT
DETERMINE FEATURE OF OBJECT
130
ONE ROCKER SWITCH
DETERMINE RECOMMENDED IOT DEVICE
140

SWITCH

ELECTRICAL OUTLET

330

310

320

350

Switch Detection Dataset

340

Electrical Outlet Detection Dataset

FIG. 6

| OBJECT | RECOMMENDED IoT DEVICE |
|---|---|
| ROTARY SWITCH | SMART SWITCH (1..n) |
| ROCKER SWITCH | SMART SWITCH (1..n) |
| TOUCH SWITCH | SMART SWITCH (1..n) |
| SLIDING SWITCH | SMART SWITCH (1..n) |
| POWER SUPPLY OUTLET | SMART PLUG, SMART POWER STRIP |
| IR RECEIVER | IR BLASTER |
| WINDOW | CURTAIN CONTROLLER |
| DOOR | SMART DOOR LOCK |
| TV | TV SOUND-INTERWORKING LINE LED |
| TABLE | SMART ILLUMINATION |
| BABY BED | IP CAMERA, BABY MONITORING DEVICE |
| GAS APPARATUS, SINK | GAS DETECTION DEVICE, WATER LEAKAGE DETECTION DEVICE |
| AUTOMATED RECIPE CANDIDATE RECOGNITION | AUTOMATED RECIPE RECOMMENDATION |

FIG. 8

| OBJECT | RECOMMENDED IOT DEVICE | IOT DEVICE MODEL |
|---|---|---|
| POWER SUPPLY OUTLET | SMART PLUG, SMART POWER STRIP | BRAND "A", ··· |
| IR RECEIVER | IR BLASTER | BRAND “A” IR BLASTER, ··· |
| TV | TV SOUND-INTERWORKING LINE LED | BRAND "B", BRAND "C", ··· |
| TABLE | SMART ILLUMINATION | BRAND "D", BRAND "C", ··· |
| BABY BED | IP CAMERA, BABY MONITORING DEVICE | BRAND A, ··· |
| KITCHEN | GAS DETECTION DEVICE,<br>WATER LEAKAGE DETECTION DEVICE | BRAND A, ··· |

| | Movability Level | Position Movement Cycle | Height |
|---|---|---|---|
| THIRD LAYER | ML4 | Within 1 Week | More than 2m |
| SECOND LAYER | ML3 ML2 | Within 1 month | 1m ~ 2m |
| FIRST LAYER | ML1 | 1 month or more | 1m or less |

| OBJECT | IOT DEVICE |
| --- | --- |
| AIR CONDITIONER | SMART PLUG |
| SWITCH | SMART SWITCH |

METHOD AND DEVICE FOR PROVIDING INFORMATION ABOUT IoT DEVICE AVAILABLE IN USER INDOOR AREA

CROSS-REFERENCE TO RELATED APPLICATIONS

This application is a by-pass continuation application of International Application No. PCT/KR2023/019513, filed on Nov. 30, 2023, which is based on and claims priority to Korean Patent Application Nos. 10-2023-0006996, filed on Jan. 17, 2023, and 10-2023-0013180, filed on Jan. 31, 2023 in the Korean Intellectual Property Office, the disclosures of which are incorporated by reference herein their entireties.

BACKGROUND

1. Field

The disclosure relates to a method and a device for providing information about an Internet-of-Things (IoT) device. More specifically, a method and a device for providing information about an IoT device available in a user's indoor area may be provided.

2. Description of Related Art

IoT technologies provide various IoT devices available in indoor areas (such as rooms). Users may establish smart homes by commanding IoT devices, which are connected with a communication network. However, the users may not know whether various IoT devices are present in the indoor areas and how to use them, and thus, cannot apply IoT devices to the users' indoor areas. Therefore, there may be a need for a system and a method for recommending available IoT devices and their respective locations in the users' indoor areas.

SUMMARY

According to an embodiment of the disclosure, a method of providing information about an Internet-of-Things (IoT) device available in an indoor area is provided. The method may include identifying an object in a captured image of the indoor area. The method may include identifying a feature of the object based on the captured image. The feature may be related to at least one operation method of the object or a configuration of the object. The method may include determining an IoT device corresponding to the object, based on a type of the object and the feature of the object. The method may include providing information about the determined IoT device.

According to an embodiment, a computer-readable recording medium having stored thereon a program to perform the method is provided.

According to an embodiment of the disclosure, an electronic device configured to provide information about an Internet-of-Things (IoT) device available in an indoor area is provided. The electronic device may include at least one processor; and a memory storing at least one instruction. The at least one processor may be configured to execute the at least one instruction to identify an object in a captured image of the indoor area. The at least one processor may be configured to execute the at least one instruction to identify a feature of the object based on the captured image, the feature being related to at least one operation method of the object or a configuration of the object. The at least one processor may be configured to execute the at least one instruction to determine an IoT device corresponding to the object, based on a type of the object and the feature of the object. The at least one processor may be configured to execute the at least one instruction to provide information about the determined IoT device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a method of identifying an object, according to an embodiment of the disclosure;

FIG. 6 is a diagram illustrating a method of determining a recommended IoT device, according to an embodiment of the disclosure;

FIG. 8 is a diagram illustrating a method of determining a recommended IoT device, according to an embodiment of the disclosure;

DETAILED DESCRIPTION

Figure 1:
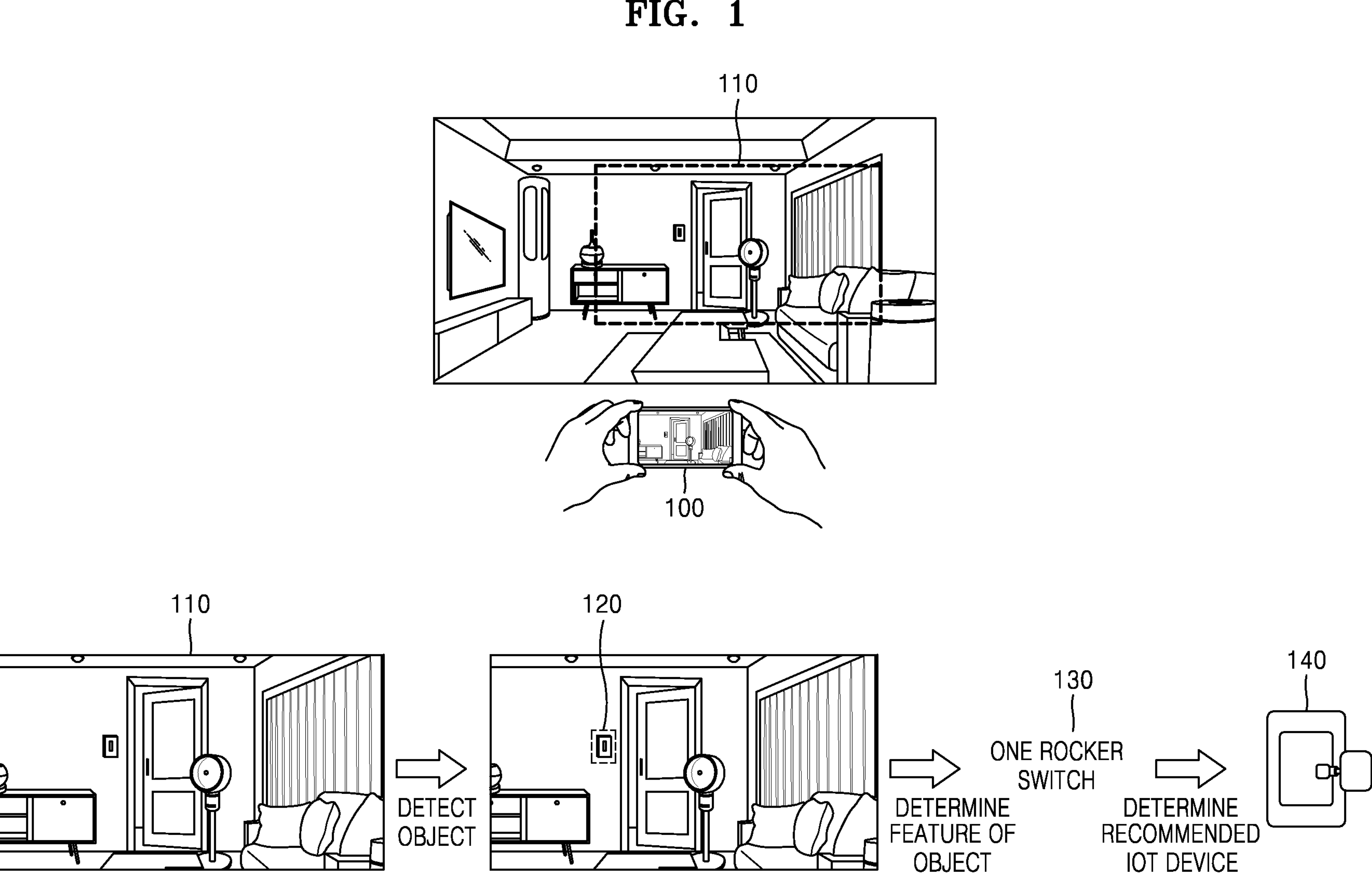
FIG. 1 is a diagram illustrating a method, performed by an electronic device, of providing information about a recommended Internet-of-Things (IoT) device, according to an embodiment of the disclosure.

Throughout the disclosure, the expression "at least one of a, b or c" indicates only a, only b, only c, both a and b, both a and c, both b and c, or all of a, b, and c.

Although terms used herein are from among general terms which are currently and broadly used while considering functions in the disclosure, these terms may vary depending on intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein should be defined based on the meaning thereof and descriptions made throughout the specification, rather than simply based on the names thereof.

The singular terms used herein are intended to include the plural forms as well, unless the context clearly indicates otherwise. All terms used herein, including technical and scientific terms, have the same meaning as generally understood by those of ordinary skill in the art. In addition, although the terms including ordinal numbers, such as "first", "second", and the like, may be used herein to describe various components, these components should not be limited by these terms. These terms are used only to distinguish one component from another component.

Throughout the specification, when a region such as an element, a component, a layer, or the like is referred to as "comprising" or "including" a component such as an element, a region, a layer, or the like, the region may further include another component in addition to the component rather than exclude the other component, unless otherwise stated. In addition, the term such as " . . . unit", " . . . portion", " . . . module", or the like used herein refers to a unit for processing at least one function or operation, and this may be implemented by hardware, software, or a combination of hardware and software.

The disclosure may have various changes thereto and have various embodiments, and thus, specific embodiments of the disclosure are illustrated in the accompanying drawings and will be described in detail in the following detailed description. However, it should be understood that the disclosure is not limited to these embodiments and all changes, equivalents and replacements made thereto without departing from the spirit and scope of the disclosure fall within the scope of the disclosure.

In describing the embodiments, when it is determined that specific descriptions of related techniques known in the art may make the gist of the disclosure unnecessarily unclear, detailed descriptions thereof are omitted. In addition, numbers (for example, $1^{st}$, $2^{nd}$, and the like) used herein to make descriptions are only identification symbols for distinguishing one component from another component.

Herein, it should be understood that, when one component is referred to as being "coupled to" or "connected to" another component, the one component may be directly coupled to or directly connected to the other component or may be coupled to or connected to the other component with an intervening component therebetween, unless otherwise stated.

Herein, when a component is represented by the term such as " . . . unit", " . . . portion", " . . . module", or the like, two or more components may be integrated into one integrated component, or one component may be sub-divided into two or more sub-components according to functionality. In addition, regarding respective components described below, a component may additionally perform some or all of functions of another component, or some of functions of the component may be wholly responsible for and performed by the other component.

Functions related to artificial intelligence according to the disclosure are operated by a processor and a memory. The processor may include one or more processors. Here, the one or more processors may include a general-purpose processor, such as a central processing unit (CPU), an application processor, or a digital signal processor (DSP), a graphics-dedicated processor, such as a graphics processing unit (GPU) or a vision processing unit (VPU), or an artificial intelligence-dedicated processor, such as a neural processing unit (NPU). The one or more processors control input data to be processed according to predefined operation rules or artificial intelligence models, which are stored in the memory. Alternatively, when the one or more processors are artificial intelligence-dedicated processors, the artificial intelligence-dedicated processors may be designed in a hardware structure specialized for processing of a particular artificial intelligence model.

The predefined operation rules or the artificial intelligence models are made through training. Here, the statement of being made through training means that a basic artificial intelligence model is trained by a learning algorithm by using a large number of training data, thereby making a predefined operation rule or an artificial intelligence model, which is configured to perform a desired characteristic (or purpose). Such training may be performed in a device itself, in which artificial intelligence according to the disclosure is performed, or may be performed via a separate server and/or a separate system. Examples of the learning algorithm may include, but are not limited to, supervised learning, unsupervised learning, semi-supervised learning, and reinforcement learning.

The artificial intelligence model may include a plurality of neural network layers. Each of the plurality of neural network layers has a plurality of weight values and performs neural network calculations through calculations between a calculation result of a previous layer and the plurality of weight values. The plurality of weight values of the plurality of neural network layers may be optimized by a training result of the artificial intelligence model. For example, the plurality of weight values may be updated to minimize a loss value or a cost value, which is obtained from the artificial intelligence model during the process of training. An artificial neural network may include a deep neural network (DNN), and examples of the artificial neural network may include, but are not limited to, a convolutional neural network (CNN), a DNN, a recurrent neural network (RNN), a restricted Boltzmann machine (RBM), a deep belief network (DBN), a bidirectional recurrent deep neural network (BRDNN), and deep Q-Networks.

FIG. 1 is a diagram illustrating a method, performed by an electronic device, of providing information about a recommended Internet-of-Things (IoT) device, according to an embodiment of the disclosure.

Referring to FIG. 1, an electronic device 100 may identify an object 120, which is included in an indoor area, from a captured image 110 of the indoor area and may determine a recommended IoT device 140 capable of being used for the object 120. Herein, although descriptions are made under the premise that the electronic device 100 is a mobile device, the disclosure is not limited thereto and the electronic device 100 may include various assistant robots (for example, a robot cleaner) driven for user convenience, an augmented reality (AR) device, a virtual reality (VR) device, or a device detecting an ambient environment and providing a certain service in a specific location or area.

According to an embodiment of the disclosure, the electronic device 100 may obtain a captured image 110 of a user's indoor area. The electronic device 100 may obtain the captured image 110 by capturing an image of the user's indoor area by using a camera of the electronic device 100. For example, a robot cleaner may capture an image of the user's indoor area while performing a task (for example, cleaning). For example, a user may capture an image of the user's indoor area by using a camera of a mobile device. The electronic device 100 may obtain the captured image 110 by receiving an image captured by a camera external to the electronic device 100. For example, the electronic device 100 may obtain an image, which is captured by a robot cleaner, through a communication hub device that is connected with the electronic device 100 and the robot cleaner.

The electronic device 100 according to an embodiment of the disclosure may identify an object 120 in the captured image 110. The object 120 may include at least one of a device or equipment. The device is an object capable of being used in the user's indoor area and may include a switch, an electrical outlet, a remote control, a television (TV), or an air conditioner. The equipment is an object capable of being arranged in the user's indoor area and may include a curtain, a table, or a sofa. A method, performed by the electronic device 100, of identifying the object 120, according to an embodiment of the disclosure, is described in detail with reference to FIG. 3.

The electronic device 100 according to an embodiment of the disclosure may identify the object 120 in the captured image 110 by using an artificial intelligence model. The electronic device 100 may identify the object 120 in the captured image 110 by using an artificial intelligence model trained to identify an object in an input image. For example, the electronic device 100 may identify a switch in the captured image 110 by using an artificial intelligence model.

The electronic device 100 according to an embodiment of the disclosure may identify a feature 130 of the object 120. The feature 130 may be related to at least one operation method of the object 120 and a configuration of the object 120. The operation method of the object 120 may refer to a method of performing a function of the object 120. The operation method of the object 120 may vary depending on the type of the object 120. The configuration of the object 120 may include the number and/or types of components that are necessary for the object 120 to operate. The feature 130 of the object 120, according to an embodiment of the disclosure, is described in detail with reference to FIG. 4.

The electronic device 100 according to an embodiment of the disclosure may identify the feature 130 of the object 120 in the captured image 110 by using an artificial intelligence model. For example, the electronic device 100 may identify the feature 130 of the object 120 in the captured image 110 by using an artificial intelligence model that is trained to identify a feature of an object in an input image. For example, the electronic device 100 may obtain the feature 130 of the object 120 as an output of an artificial intelligence model by inputting an image, which corresponds to the object 120 of the captured image 110, to the artificial intelligence model.

The electronic device 100 according to an embodiment of the disclosure may determine an IoT device 140 corresponding to the object 120, based on at least one of the type of the object 120 or the feature 130 of the object 120. The IoT device 140 corresponding to the object 120 may refer to an IoT device that is connected with a network and performs a function for the object 120.

The IoT device 140 corresponding to the object 120 may include an IoT device 140 for controlling the object 120, an IoT device 140 for changing the state of the object 120, or an IoT device 140 for controlling an operation of the object 120. For example, the electronic device 100 may determine a smart switch to be an IoT device corresponding to a switch. The smart switch may be an IoT device including a function of applying a physical pressure to a switch to operate the switch. The smart switch may control on/off operations of a switch or change the state of the switch by providing a physical pressure to the switch. The electronic device 100 may determine a smart plug to be an IoT device corresponding to a plug. The smart plug may be an IoT device including a function of controlling the supply of power to an electronic device connected to a plug. The smart plug may control the state of power, which is supplied to an electronic device connected to a plug, into "ON" or "OFF".

The electronic device 100 may determine an IoT device corresponding to the object 120 and may provide information about the determined IoT device to the user. The electronic device 100 may help the user in designing a smart home by using an IoT device available in the user's indoor area.

Referring to FIG. 1, although descriptions are made by taking only one object in the captured image 110 as an example for convenience, the disclosure is not limited thereto and the descriptions made above may also be equally applied to one or more objects in the captured image 110.

Figure 2:
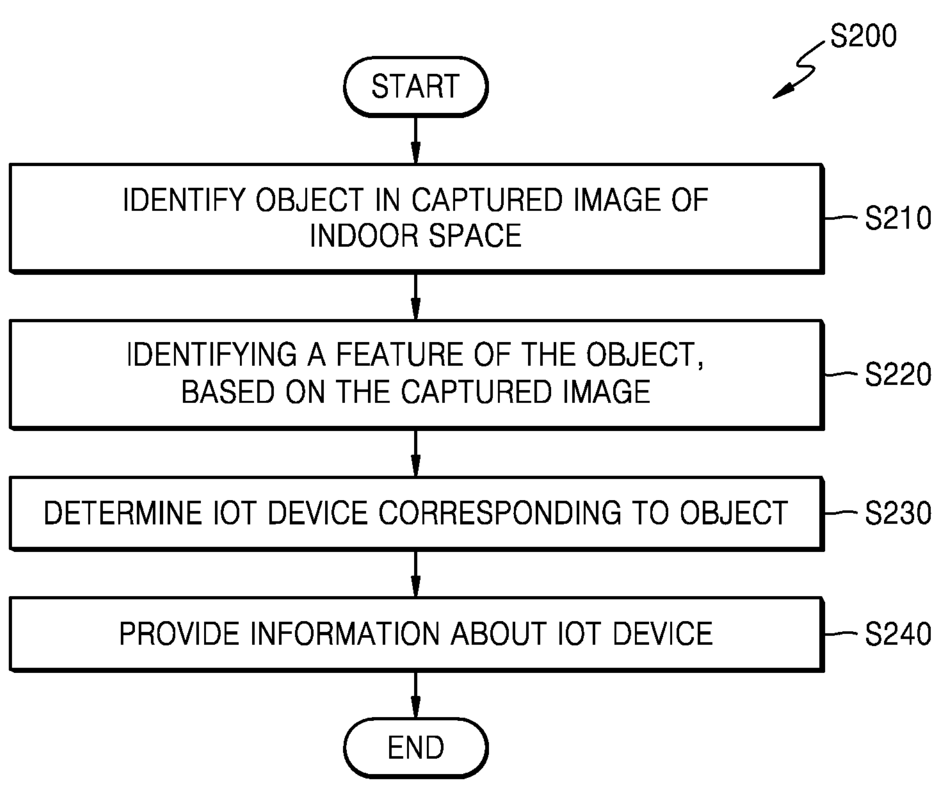
FIG. 2 is a flowchart illustrating a method of providing information about a recommended IoT device, according to an embodiment of the disclosure.

FIG. 2 is a flowchart illustrating a method of providing information about a recommended IoT device, according to an embodiment of the disclosure.

Referring to FIG. 2, a method S200, performed by the electronic device 100, of providing information about a recommended IoT device, according to an embodiment of the disclosure, may begin with operation S210.

In operation S210, the electronic device 100 may identify an object in a captured image of a user's indoor area. The object may include a device or equipment in the user's indoor area. The device may include at least one of a switch, an electrical outlet, a remote control, a TV, or an air conditioner. The equipment may include at least one of a curtain or a table. According to an embodiment of the disclosure, the electronic device 100 may identify the object in the captured image by using an artificial intelligence model trained to output an object in an input image (such as the captured image).

In operation S220, the electronic device 100 may identify a feature of the object. The feature may be related to (or correspond to) at least one operation method of the object or a configuration of the object. According to an embodiment of the disclosure, the electronic device 100 may identify the feature of the object by using an artificial intelligence model trained to output a feature of an object in an input image. The input image of the artificial intelligence model for identifying the feature of the object may be an image, which corresponds to the object, in a captured image. In an embodiment, the electronic device 100 may identify a feature of an object by using a different artificial intelligence model trained for each identified object. For example, the electronic device 100 may use an artificial intelligence model trained to output a feature of a switch, based on identifying that a switch is included in a captured image.

In operation S230, the electronic device 100 may determine an IoT device corresponding to the object. The electronic device 100 may determine the IoT device based on a type of the object and the feature of the object. In an embodiment, the electronic device 100 may determine the IoT device by using a table in which recommended IoT devices are predetermined for respective types of objects and respective features of objects.

In operation S240, the electronic device 100 may provide information about the IoT device that is determined in operation S230. The electronic device 100 may provide (or transmit) the information about the IoT device to an external electronic device or to a user. The electronic device 100 may provide the information about the IoT device by displaying the information about the IoT device.

Figure 3:
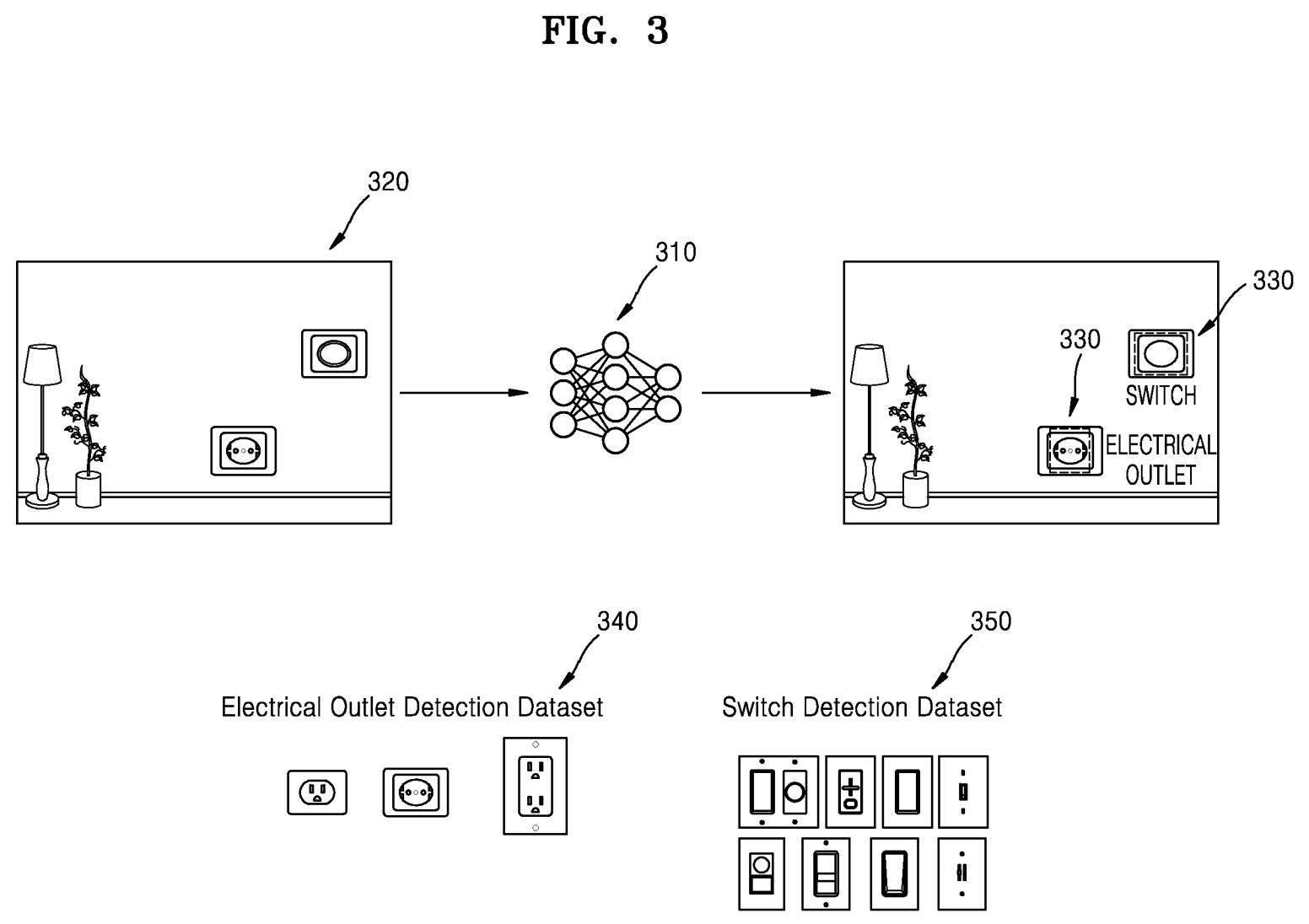

FIG. 3 is a diagram illustrating a method of identifying an object, according to an embodiment of the disclosure.

According to an embodiment of the disclosure, the electronic device 100 may identify an object, which is included in a captured image, by using an artificial intelligence model 310. The electronic device 100 may identify the type of the object and the position of the object by using the artificial intelligence model 310.

The artificial intelligence model 310 according to an embodiment of the disclosure may be trained by using training data including an input image 320 and object identification information 330. The input image 320 may be an image including one or more objects in a user's indoor area. The object identification information 330 may include information about at least one of the type of the object or the position of the object, the object being included in the input image 320. For example, the input image 320 may include a switch and an electrical outlet. The object identification information 330 may include information indicating that objects in the input image 320 are a switch and an electrical outlet, the position of the switch, and the position of the electrical outlet.

The artificial intelligence model 310 according to an embodiment of the disclosure may be trained to identify the type of an object regardless of an operation method of the object or a configuration of the object. For example, an electrical outlet detection dataset 340 may include data regarding electrical outlets including different features from each other, such as one 110 V electrical outlet, two 220 V electrical outlets, or two 110 V electrical outlets. A switch detection dataset 350 may include data about switches including different features from each other, such as a rocker switch, a rotary switch, a touch switch, or a sliding switch. The type of the object may refer to the type of a device or equipment available indoors, such as an electrical outlet or a switch. The feature of the object is a feature related to an operation method or a configuration of the object and may include an operation method of an electrical outlet (for example, including a 110 V connection terminal, or including a 220 V connection terminal) or the number of components of an electrical outlet (for example, the number of connection terminals).

In an embodiment, the electronic device 100 or by an external server may train the artificial intelligence model 310.

Figure 4:
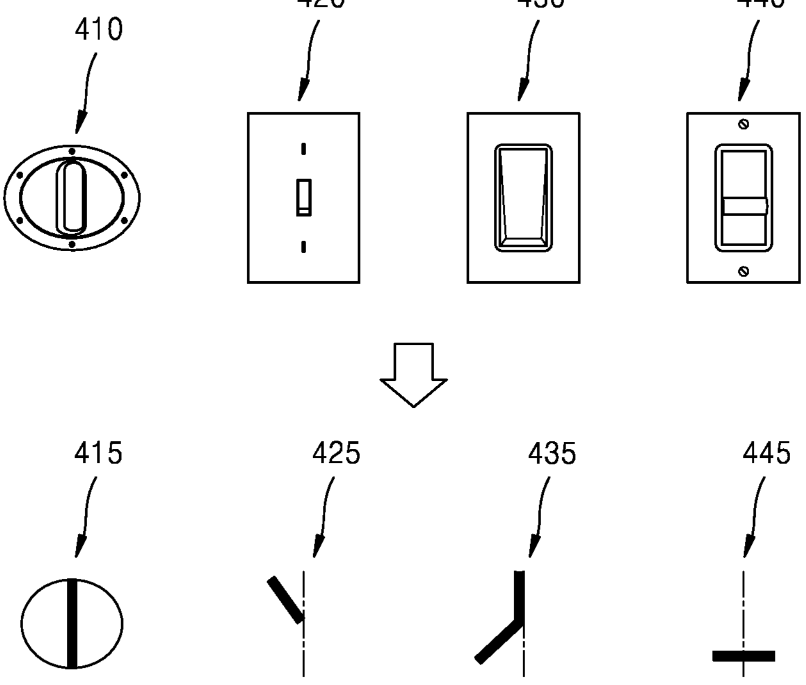
FIG. 4 is a diagram illustrating a feature of an object, according to an embodiment of the disclosure.

FIG. 4 is a diagram illustrating a feature of an object, according to an embodiment of the disclosure.

Referring to FIG. 4, although the object according to an embodiment of the disclosure may include a switch, the disclosure is not limited thereto and the object may include a device or equipment, which may be in a user's indoor area.

Objects according to an embodiment of the disclosure may be classified based on at least one operation method of each object or the number of components of each object. For example, a switch may be classified as a rotary switch 410, a rocker switch 420, a touch switch 430, a sliding switch 440, or the like.

The rotary switch 410 may perform a function of a switch, based on a component of the rotary switch 410 that detects a pressure and is rotated. For example, the rotary switch 410 may perform a function of a switch, based on an angle by which a circular component of the rotary switch 410 is rotated.

The rocker switch 420 may perform a function of a switch by a change in a direction indicated by a component of the rocker switch 420. For example, the rocker switch 420 may perform a function of a switch by changing a direction indicated by a button from a first direction to a second direction.

The touch switch 430 may perform a function of a switch, based an electrical signal that is detected by a sensor of the touch switch 430. For example, the touch switch 430 may perform a function of a switch, based on the body of a user, which is brought into contact with a sensor of the touch switch 430 and based on an electrical signal that is detected by the sensor.

The sliding switch 440 may perform a function of a switch, based on a component of the sliding switch 440 that detects an input and that is moved in a certain direction. For example, the sliding switch 440 may perform a function of a switch, based on a component of the sliding switch 440 that is moved in a vertical direction from a first position to a second position.

The electronic device 100 according to an embodiment of the disclosure may identify a feature of an object. The feature of the object may include at least one operation method of the object or the number of components of the object. The electronic device 100 may identify an object from a captured image and may identify a feature of the identified object. The feature of the object may include a sub-category of the object. For example, the electronic device 100 may identify an object in a captured image to be a switch and may identify, as a feature of the object, the feature that the object is a "rocker switch" corresponding to a sub-category of a switch.

The electronic device 100 may identify a rotary switch 410 from a captured image and may identify a feature 415 of the identified rotary switch 410. For example, the electronic device 100 may identify, as the feature of the object, at least one of the feature that an identified switch includes a rotatable component, the feature that there is one component, or the feature that a direction of a rotatable component is a vertical direction.

The electronic device 100 may identify a rocker switch 420 from a captured image and may identify a feature 425 of the identified rocker switch 420. For example, the electronic device 100 may identify, as the feature of the object, at least one of the feature that an identified switch includes a component indicating a certain direction, the feature that there is one component, or a feature regarding a direction indicated by the switch.

The electronic device 100 may identify a touch switch 430 from a captured image and may identify a feature 435 of the identified touch switch 430. For example, the electronic device 100 may identify, as the feature of the object, at least one of the feature that an identified switch includes a touch sensor or the feature that there is one component.

The electronic device 100 may identify a sliding switch 440 from a captured image and may identify a feature 445 of the identified sliding switch 440. For example, the electronic device 100 may identify, as the feature of the object, at least one of the feature that an identified switch includes a slidable component, the feature that there is one component, or a feature regarding the position of the switch.

Figure 5:
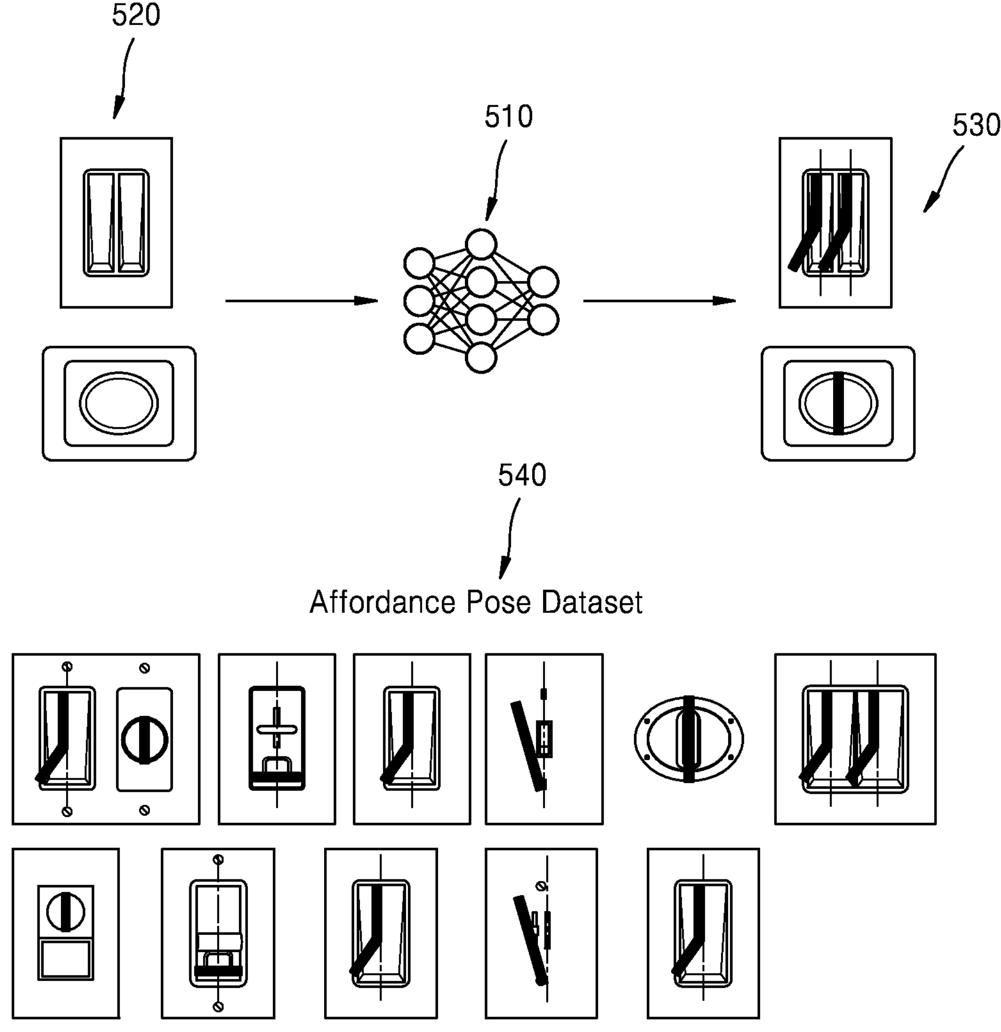
FIG. 5 is a diagram illustrating a method of identifying a feature of an object, according to an embodiment of the disclosure.

FIG. 5 is a diagram illustrating a method of identifying a feature of an object, according to an embodiment of the disclosure.

According to an embodiment of the disclosure, the electronic device 100 may identify a feature of an object by using an artificial intelligence model 510. The artificial intelligence model 510 may output a feature of an object by taking, as an input, an image corresponding to the object in a captured image.

An object feature information 530 according to an embodiment of the disclosure may include a pose of an object. For example, the electronic device 100 may output a pose of an object by taking an image, which corresponds to a switch, as an input of the artificial intelligence model 510. The pose of the object may include at least one of the shape of a component of the object, the current position of the component, or the direction of the component.

The artificial intelligence model 510 according to an embodiment of the disclosure may be trained by using training data including an input image 520 and the object feature information 530. For example, a switch pose dataset 540 may include an image of a switch and information about a feature of the switch. The input image 520 may be an image corresponding to an object that is identified by the electronic device 100 from a captured image. The object feature information 530 may include information at least one operation method of an object, which is included in the input image 520, or the number of components of the object. For example, the input image 520 may be an image corresponding to a switch, and the object feature information 530 may include information about an operation method of the switch (for example, a rocker switch) and the number of components (for example, one switch).

FIG. 6 is a diagram illustrating a method of determining a recommended IoT device, according to an embodiment of the disclosure.

Referring to FIG. 6, a recommended IoT device corresponding to an object may be predetermined. The electronic device 100 according to an embodiment of the disclosure may determine a recommended IoT device, based on a feature of an object. Although FIG. 6 illustrates a table including IoT devices respectively corresponding to objects, the disclosure is not limited thereto.

When the object is a "rotary switch", the electronic device 100 may determine the recommended IoT device to be a "smart switch for a rotary switch". The smart switch for a rotary switch may be a switch in which a component of the switch is configured to rotate.

When the object is a "rocker switch", the electronic device 100 may determine the recommended IoT device to be a "smart switch for a rocker switch". The smart switch for a rocker switch may be a switch including a function of applying a pressure to change the direction of a component of the switch.

When the object is a "touch switch", the electronic device 100 may determine the recommended IoT device to be a "smart switch for a touch switch". The smart switch for a touch switch may be a switch including a function of providing an electrical input to a component of the switch.

When the object is a "sliding switch", the electronic device 100 may determine the recommended IoT device to be a "smart switch for a sliding switch". The smart switch for a sliding switch may be a switch including a component configured to change the position of the component. When the number of input components of the switch is n, the smart switch may be a smart switch including a component configured to provide an input to the n input components.

When the object is a "power supply outlet", the electronic device 100 may determine the recommended IoT device to be a "smart plug" or a "smart power strip". The smart plug or the smart power strip refers to a plug or a power strip, which is connected with a network and thus able to perform a function of shutting off the power.

When the object is a device (for example, an air conditioner or an air purifier) including an "infrared (IR) receiver", the electronic device 100 may determine the recommended IoT device to be an "IR blaster". The IR blaster refers to a device capable of being connected with a network and performing a function of transmitting an IR signal.

When the object is a "window" or a "curtain", the electronic device 100 may determine the recommended IoT device to be a "curtain controller". The curtain controller refers to a device capable of being connected with a network and performing a function of moving a curtain. The electronic device 100 may recommend an output voltage or an operation method (for example, battery operated, or plugged-in operated) of the curtain controller or a design (for example, the type, color, or length) of a curtain, based on the shape or size of a curtain rail or a curtain ring or on an ambient environment.

When the object is a "door", the electronic device 100 may determine the recommended IoT device to be a "smart door lock". The smart door lock refers to a device capable of being connected with a network and performing a function of controlling the opening and closing of a door.

When the object is a "table", the electronic device 100 may determine the recommended IoT device to be a "smart illumination". When the object is a "baby bed", the electronic device 100 may determine the recommended IoT device to be a "baby monitoring device" or an "Internet protocol (IP) camera". When the object is a "gas appliance" or a "sink", the electronic device 100 may determine the recommended IoT device to be a "gas detection device" or a "water leakage detection device".

The electronic device 100 may recommend an automated recipe using IoT devices, based on one or more objects. The automated recipe may refer to a process in which the IoT devices operate.

Figure 7:
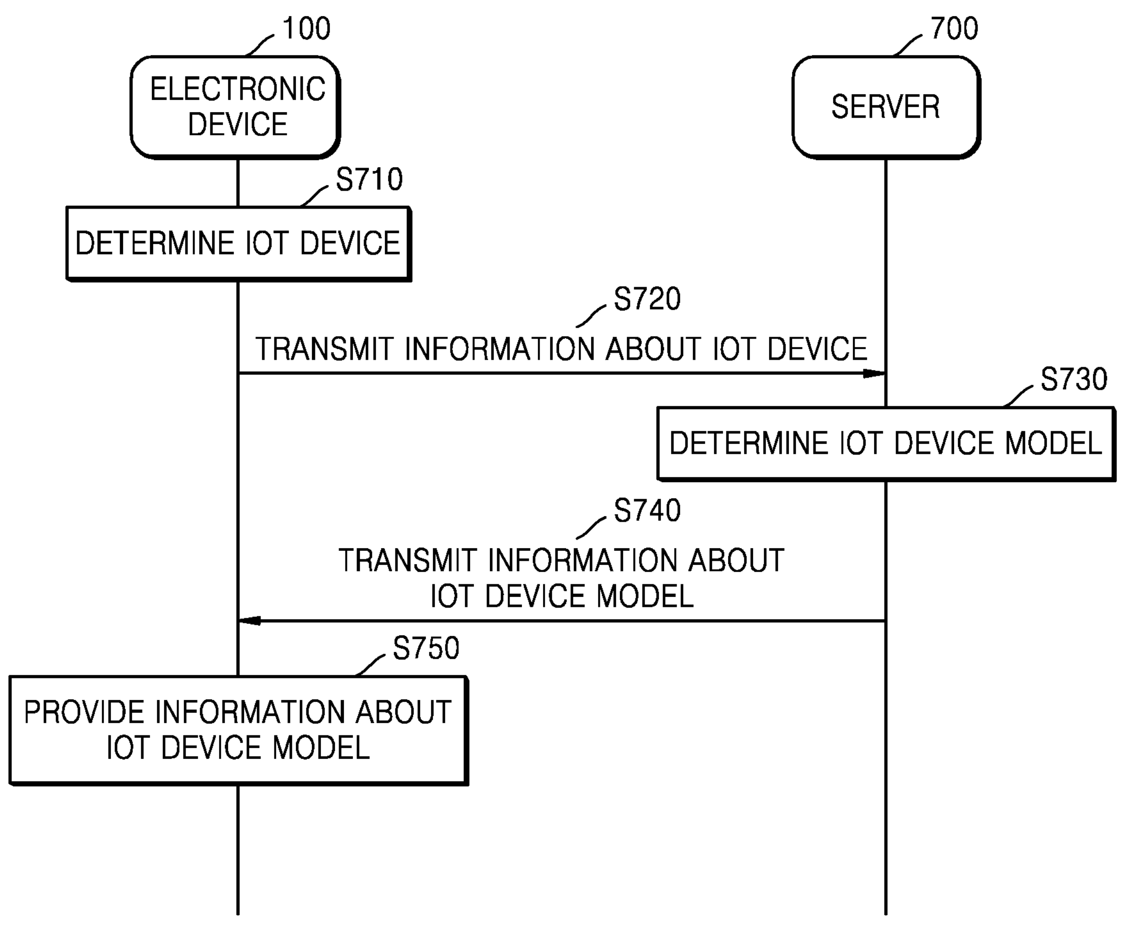
FIG. 7 is a sequence diagram illustrating a method of providing information about a recommended IoT device, according to an embodiment of the disclosure.

FIG. 7 is a sequence diagram illustrating a method of providing information about a recommended IoT device, according to an embodiment of the disclosure.

Referring to FIG. 7, the electronic device 100 may provide information about a model of an IoT device corresponding to an object by interworking with a server 700.

In operation S710, the electronic device 100 may determine an IoT device corresponding to an object in a captured image. The method, performed by the electronic device 100, of determining an IoT device, according to an embodiment of the disclosure, has been described with reference to FIGS. 1 to 6, and thus, descriptions thereof are omitted.

In operation S720, the electronic device 100 may transmit information about the IoT device to the server 700. The information about the IoT device includes the type of the IoT device determined by the electronic device 100. The information about the IoT device may further include at least one of the type of the object or the feature of the object.

In operation S730, the server 700 may determine an IoT device model based on the information about the IoT device. For example, the server 700 may determine one or more IoT device models within the type of the IoT device that is determined. The IoT device model may refer to a product on sale in relation to the determined IoT device. A method of determining an IoT device model, according to an embodiment of the disclosure, is described in more detail with reference to FIG. 8.

In operation S740, the server 700 may transmit information about the IoT device model to the electronic device 100. In operation S750, the electronic device 100 may provide the information about the IoT device model, which is received from the server 700.

FIG. 8 is a diagram illustrating a method of determining a recommended IoT device, according to an embodiment of the disclosure.

Referring to FIG. 8, recommended IoT devices respectively corresponding to objects, shown in the table, may be predetermined. The electronic device 100 according to an embodiment of the disclosure may determine the model of an IoT device, based on the type of a recommended IoT device. The model of the IoT device may refer to the brand or model name of a product that is manufactured or on sale in relation to the IoT device.

When the object is a "power supply outlet", the recommended IoT device may be predetermined to be a smart plug and a smart power strip. When the recommended IoT device is a smart plug or a smart power strip, the electronic device 100 may provide a brand called "A" as a brand of the IoT device.

The electronic device 100 according to an embodiment of the disclosure may provide the IoT device model by communicating with a server, as shown in FIG. 7.

Figure 9:
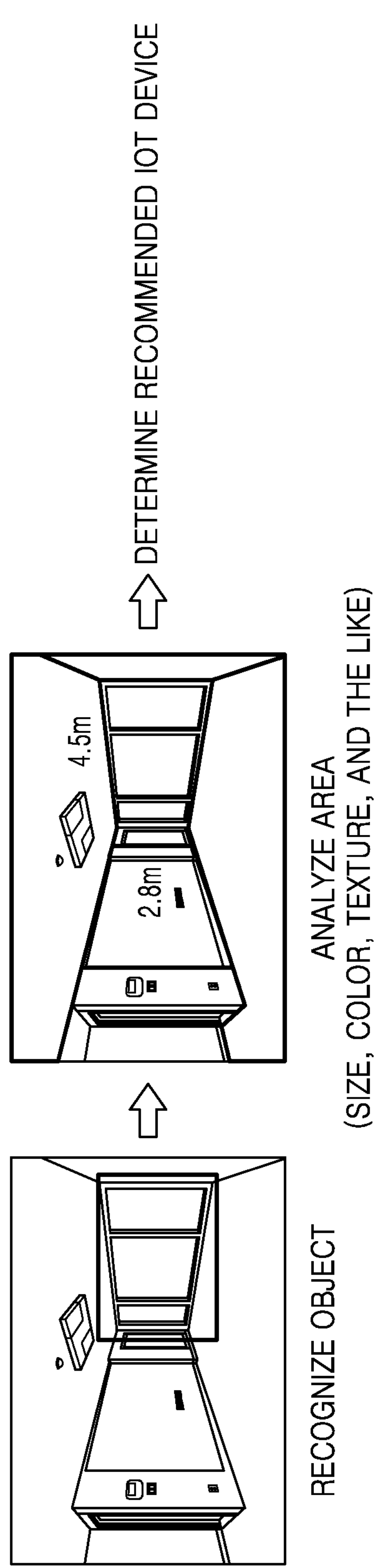
FIG. 9 is a diagram illustrating a method of determining a recommended IoT device, based on a user's indoor area, according to an embodiment of the disclosure.

FIG. 9 is a diagram illustrating a method of determining a recommended IoT device, based on a user's indoor area, according to an embodiment of the disclosure.

Referring to FIG. 9, the electronic device 100 may identify an object from a captured image. For example, the electronic device 100 may identify a window from a captured image of a living room area. The electronic device 100 may analyze a user's area. For example, the electronic device 100 may identify at least one of the size of the living room area, the color of the living room area, or the texture of the living room area.

The electronic device 100 may determine a recommended IoT device, based on analysis information of the user's area. For example, the electronic device 100 may determine the type or model of the IoT device, based on at least one of the size of the living room area, the color of the living room area, or the texture of the living room area. The electronic device 100 may recommend an IoT device having an appearance harmonizing with the user's area, by considering information about the user's area. For example, the electronic device 100 may determine an appearance with a high user preference in terms of the size, color, and texture of the user's area. The electronic device 100 may determine user preferences for the size, color, and texture of the user's area by a preset method or by using a trained artificial intelligence model. The electronic device 100 may transmit the information about the user's area to an external server and may receive, from the external server, information about an IoT device capable of being recommended with respect to the information about the user's area.

Figure 10:
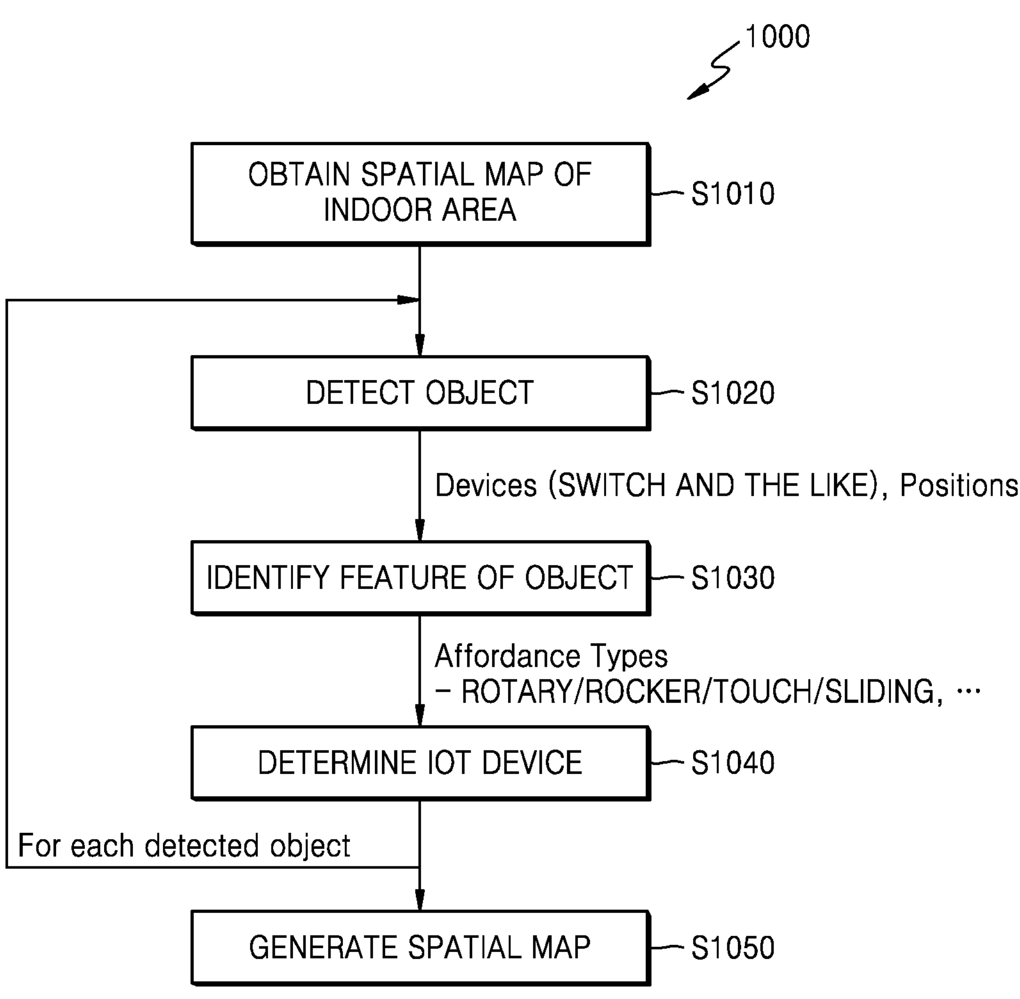
FIG. 10 is a diagram illustrating a method of generating a spatial map, according to an embodiment of the disclosure.

FIG. 10 is a diagram illustrating a method of generating a spatial map, according to an embodiment of the disclosure.

Referring to FIG. 10, a method 1000 of generating a spatial map may begin with operation S1010. The method 1000 of generating a spatial map may be performed by the electronic device 100. In operation S1010, the electronic device 100 may obtain a spatial map of a user's indoor area. The spatial map is described in detail with reference to FIGS. 11A to 12B.

In operation S1020, the electronic device 100 may detect an object based on a captured image. In operation S1030, the electronic device 100 may identify a feature of the object, based on the captured image. In operation S1040, the electronic device 100 may determine an IoT device corresponding to the object, based on the feature of the object. Operations S1020 to S1040 may be understood with reference to FIGS. 1 to 6. When there are a plurality of objects in the captured image, the electronic device 100 may perform operations S1020 to S1040 on each object.

In operation S1050, the electronic device 100 may generate a spatial map including information about the IoT device, based on the information about the IoT device and the obtained spatial map. For example, the electronic device 100 may match the information about the IoT device, which corresponds to the object, to correspond to the object in the spatial map. The electronic device 100 may provide information about an IoT device available in the user's indoor area to a user, by using the already generated spatial map of the user's indoor area. A method, performed by the electronic device 100, of providing information about an IoT device, according to an embodiment of the disclosure, is described in detail with reference to FIGS. 13 to 15.

Figure 11A:
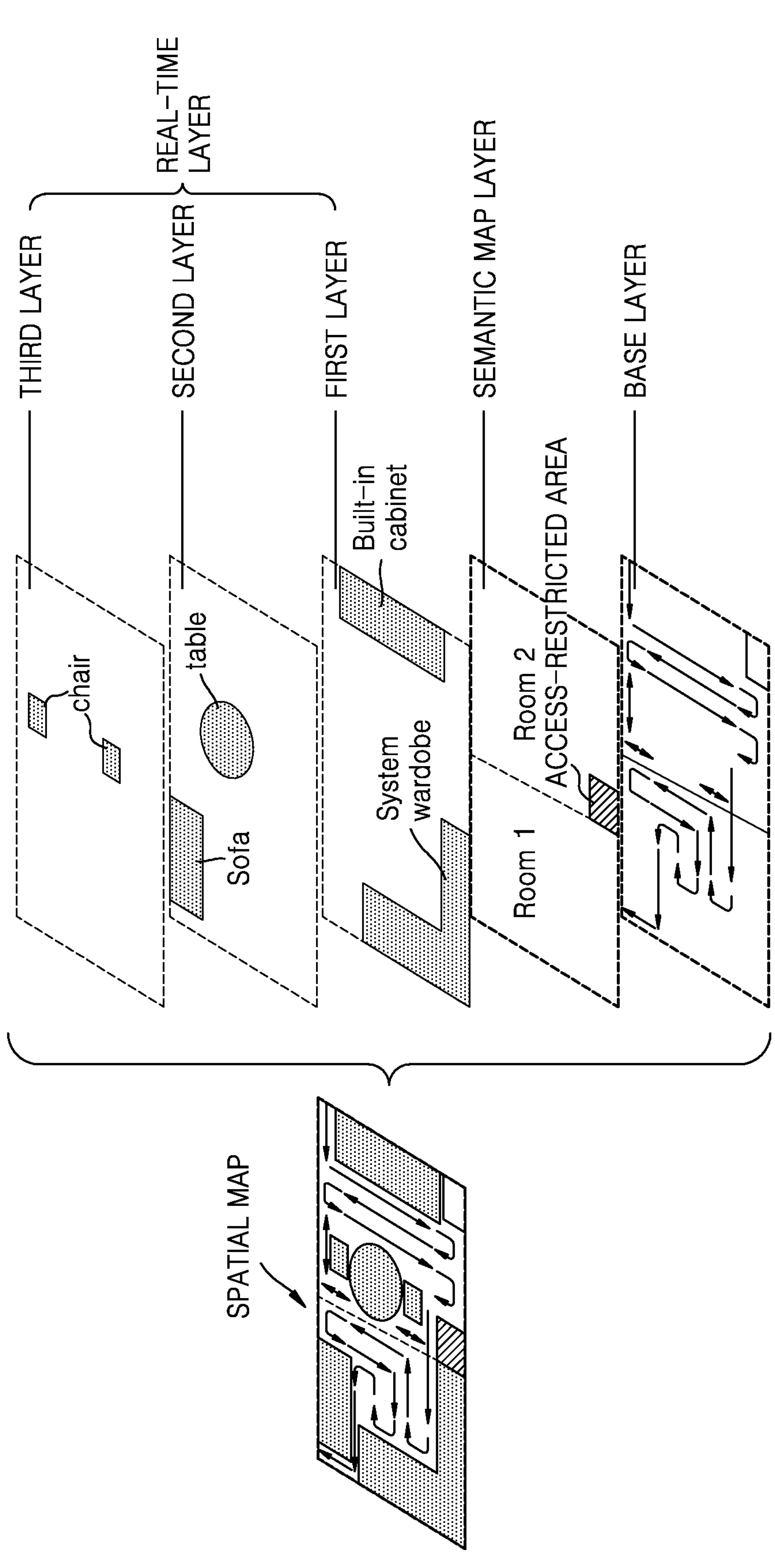
FIG. 11A is a flow diagram illustrating a spatial map according to an embodiment of the disclosure.
Figure 11B:
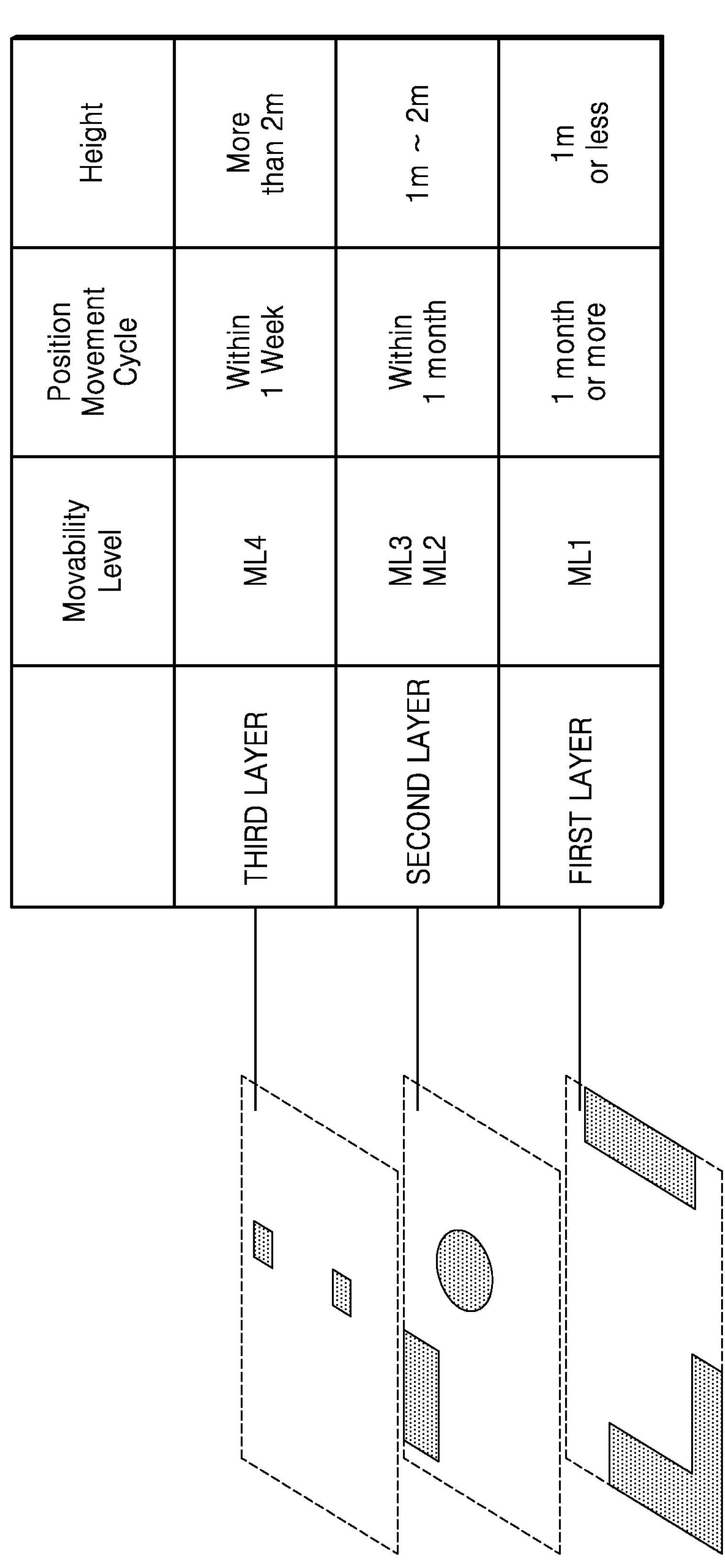
FIG. 11B is a flow diagram illustrating a spatial map according to an embodiment of the disclosure.

FIGS. 11A and 11B are each a flow diagram illustrating a spatial map.

Referring to FIG. 11A, a spatial map and a hierarchical structure between a plurality of layers constituting the spatial map are illustrated. As shown in FIG. 11A, the spatial map may include, but is not limited to, a base layer, a semantic map layer, and a real-time layer, and the number of layers may increase or decrease depending on characteristics of a task.

The base layer provides information about basic structures of a whole area, such as a wall, a pillar, and a passage. The base layer may provide 3-dimensional information of the area, position information of an object, movement trajectory information, and the like, by processing 3-dimensional point cloud data to perform coordinate system registration and store the position of the object. The base layer functions as a base map and a geometric map.

The semantic map layer is a layer for providing semantic information onto the base layer. A user may give semantic information, such as "Room 1", "Room 2", and an "access-restricted area", to the basic structures of the whole area of the base layer, and thus, the semantic information may be used for an electronic device to perform a task. For example, when the electronic device is a robot cleaner, the user may set the semantic information in the semantic map layer to cause the robot cleaner to clean only "Room 2" or not to clean the "access-restricted area".

The real-time layer is a layer for providing information about at least one object in the area. The object may include both static objects and dynamic objects. Herein, the real-time layer may include a plurality of layers that are based on attribute information of objects and may have a hierarchical structure between the layers. As shown in FIG. 11A, the real-time layer may include, but is not limited to, a first layer, a second layer, and a third layer, and the number of layers may increase or decrease depending on classification criteria for the attribute information of the objects. Referring to FIG. 11A, it can be seen that the first layer includes a system wardrobe and a built-in cabinet, the second layer includes a table and a sofa, and the third layer includes chairs.

Referring to FIG. 11B, an example of the real-time layer including a plurality of layers that are based on attribute information of objects is illustrated.

The attribute information of the objects may be information that may be classified by making a combination of objective criteria or a plurality of criteria, such as the types, shapes, sizes, and heights of the objects. In addition, because the attribute information of the objects may vary depending on users and environments, the attribute information of each object may be labeled and then input.

According to an embodiment of the disclosure, when the attribute information of the object is a mobility level (ML) of the object, an object corresponding to ML 1 may be included in the first layer, objects corresponding to ML 2 and ML 3 may be included in the second layer, and an object corresponding to ML 4 may be included in the third layer. The ML of the object may be determined by applying an objective feature of the object to certain classification criteria for evaluating the mobility. For example, ML 1 may correspond to an object that is unmovable, ML 2 may correspond to an object that is movable but mainly stays fixed, ML 3 may correspond to an object that is movable but moves sometimes, and ML 4 may correspond to an object that is movable and frequently moves.

According to an embodiment of the disclosure, when the attribute information of the object is a position movement cycle of the object, an object having not moved in position within one month may be included in the first layer, an object having moved in position within one month may be included in the second layer, and an object having moved in position within one week may be included in the third layer. Unlike the ML of the object, which is classified based on the objective feature of the object, even the same object may have a different position movement cycle, depending on a user that uses the object or on an environment in which the object is located. For example, an object called "A" may be an object that is frequently used by a first user but hardly used by a second user. An object called "B" may be an object that is frequently used in a first location but hardly used in a second location.

According to an embodiment of the disclosure, when the attribute information of the object is a height at which the object is located, an object at a height of 1 m or less may be included in the first layer, an object at a height of 1 m to 2 m may be included in the second layer, and an object at a height that is greater than 2 m may be included in the third layer.

According to an embodiment of the disclosure, the classification criteria of the plurality of layers of the real-time layer may be defined by the user. For example, the user may set the classification criteria by combining a plurality of pieces of attribute information of objects, thereby generating a spatial map reflecting characteristics of a task. For example, because a robot cleaner generally moves below a height of 50 cm, the robot cleaner does not need to consider objects at heights that are greater than 1 m, for example, an electric light, a framed picture on the wall, and the like. Therefore, the user may directly set the classification criteria for classifying each layer such that an object having ML 1 and located at a height of 1 m or less is included in the first layer, an object having ML 2 or ML 3 and located at a height of 1 m or less is included in the second layer, and an object having ML 4 and located at a height of 1 m or less is included in the third layer.

FIGS. 12A, 12B, 12C, and 12D are diagrams each illustrating a utilization method of layers constituting a spatial map.

Depending on respective types of electronic devices and IoT devices and characteristics of tasks, a spatial map used by each device may vary. Although an electronic device may use an existing spatial map stored in the electronic device, when there is a change in an area in which a task is performed, the electronic device may update the spatial map to reflect the change. The electronic device may update the existing spatial map by receiving a spatial map, which has already reflected the change generated in the area, from at least one external device. The electronic device may generate a new spatial map based on the existing spatial map.

Figure 12A:
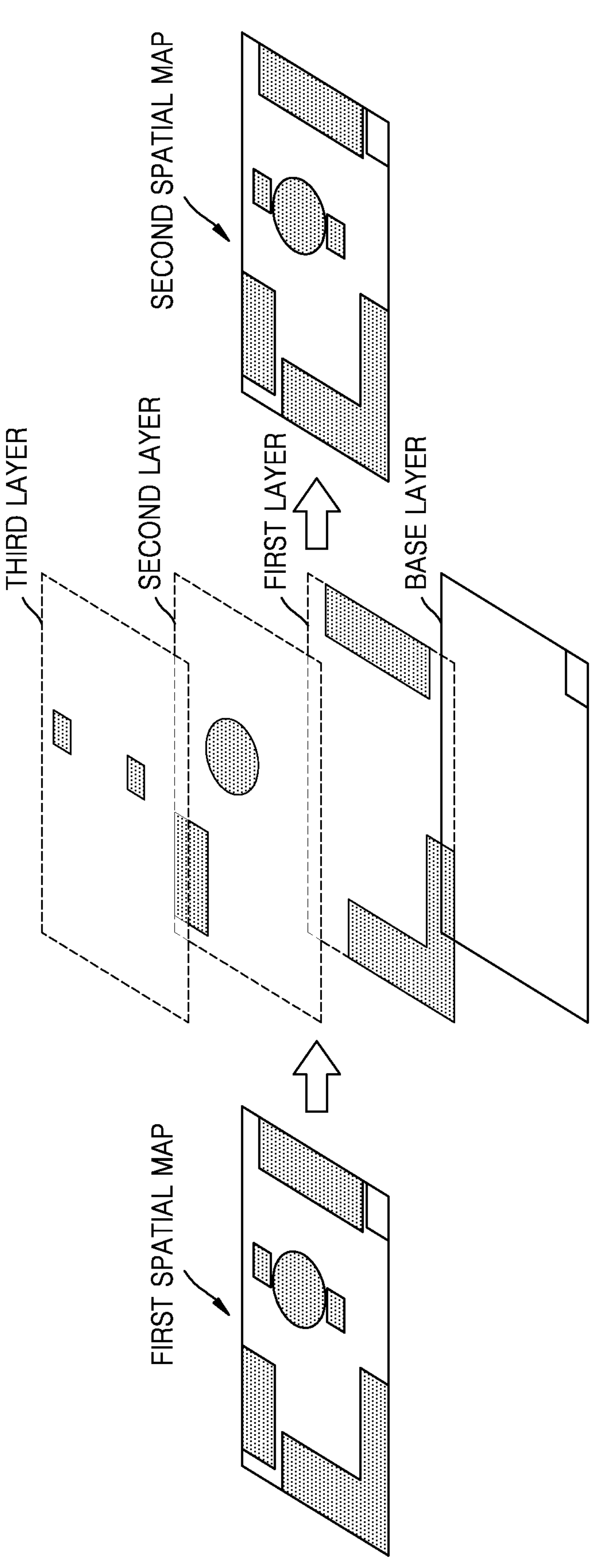
FIG. 12A is a diagram illustrating a method of using a layer constituting a spatial map, according to an embodiment of the disclosure.

Referring to FIG. 12A, the electronic device may load an existing spatial map (hereinafter, referred to as a first spatial map). The first spatial map includes a base layer, a first layer, a second layer, and a third layer. Hereinafter, for convenience, descriptions are made under the premise that each of the first to third layers includes objects according to any classification criteria of FIG. 11B. When the first spatial map was generated just a few minutes ago or there is no change in an area after the first spatial map is used, the electronic device may obtain a new spatial map (hereinafter, referred to as a second spatial map) by using the first spatial map and may use the second spatial map in performing a new task.

Figure 12B:
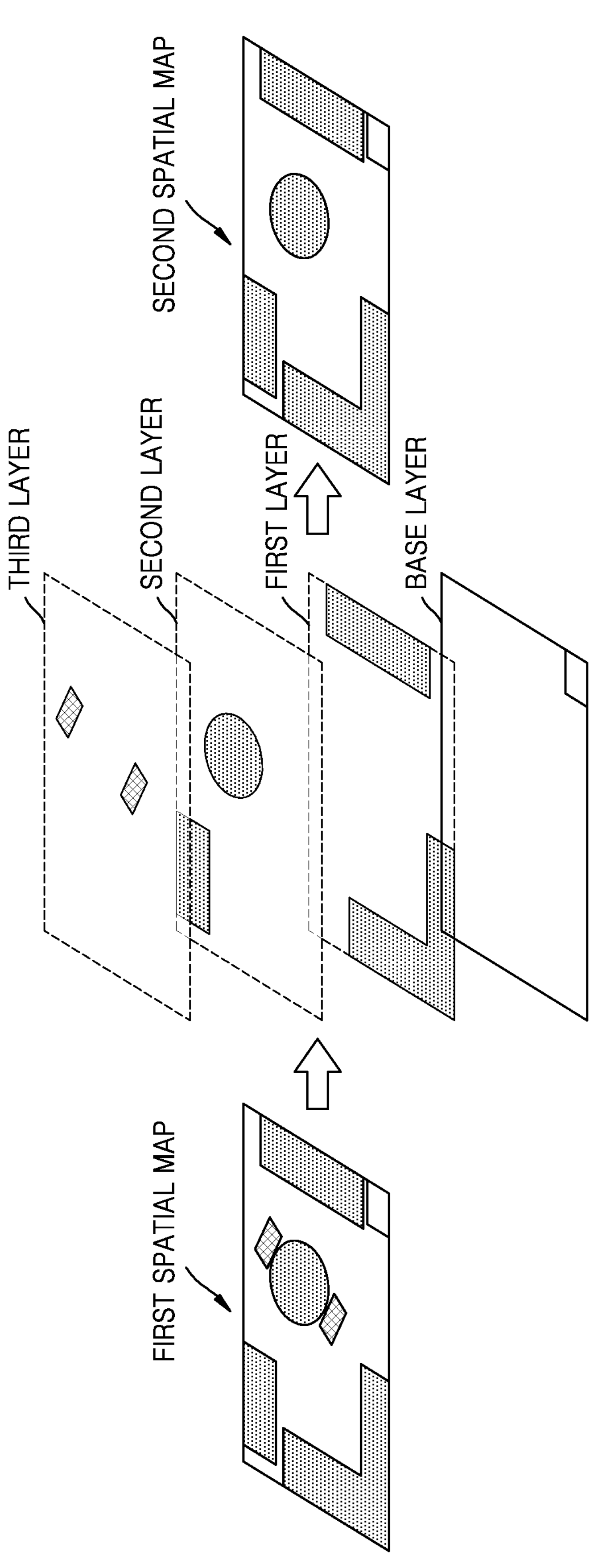
FIG. 12B is a diagram illustrating a method of using a layer constituting a spatial map, according to an embodiment of the disclosure.

Referring to FIG. 12B, the electronic device may load the first spatial map stored therein. In an example in which the electronic device performs a task, when there is no need of information about an object, which has ML 4 and frequently moves, or only information about an object having not moved for one week or more is used, the second spatial map may be obtained by selecting the base layer, the first layer, and the second layer from among the layers constituting the first spatial map or by removing the third layer from the first spatial map.

Figure 12C:
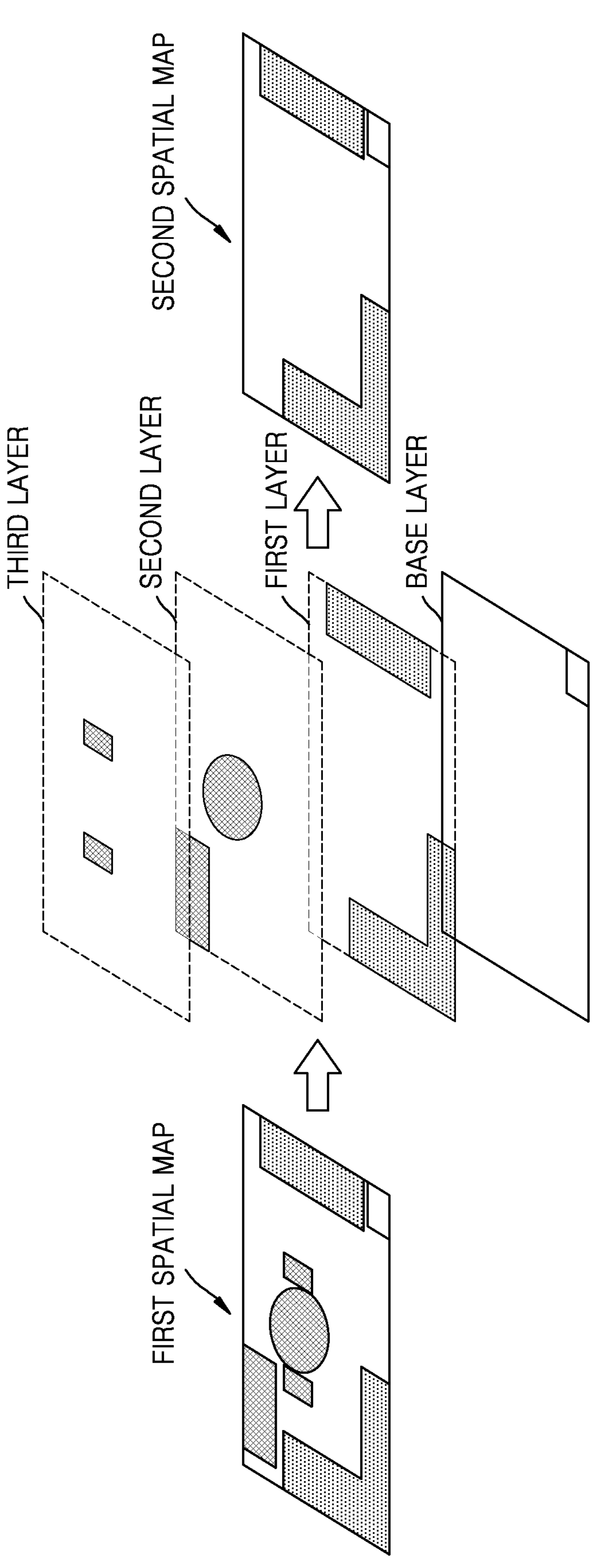
FIG. 12C is a diagram illustrating a method of using a layer constituting a spatial map, according to an embodiment of the disclosure.

Referring to FIG. 12C, the electronic device may load the first spatial map stored therein. In an example in which the electronic device performs a new task, when only information about an object with ML 1 is required or only information about an object having not moved for one month or more is used, the second spatial map may be obtained by selecting the base layer and the first layer from among the layers constituting the first spatial map or by removing the second layer and the third layer from the first spatial map.

Figure 12D:
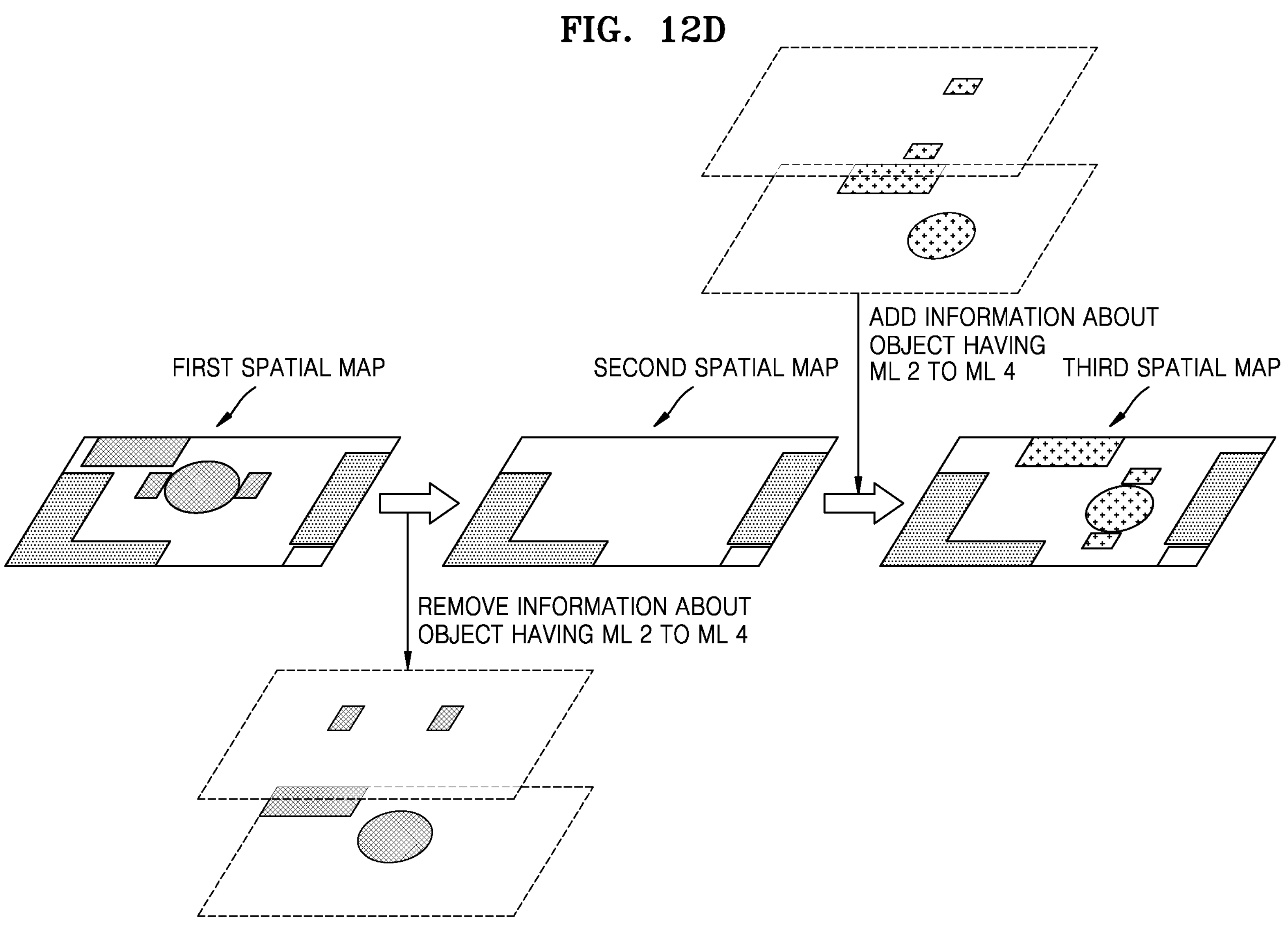
FIG. 12D is a diagram illustrating a method of using a layer constituting a spatial map, according to an embodiment of the disclosure.

Referring to FIG. 12D, the electronic device may load the first spatial map stored therein. In an example in which the electronic device performs a new task, when there is a need to reflect the latest information of objects that are movable and correspond to ML 2, ML 3, and ML 4, the second spatial map may be obtained by selecting the base layer and the first layer from among the layers constituting the first spatial map or by removing the second layer and the third layer from the first spatial map. Next, the electronic device may extract the second layer and the third layer from the spatial map received from the external device and reflect the second layer and the third layer in the second spatial map, thereby obtaining a third spatial map. Alternatively, the electronic device may detect objects corresponding to ML 2, ML 3, and ML 4 by using at least one sensor of the electronic device and reflect the objects in the second spatial map, thereby obtaining the third spatial map.

Figure 13:
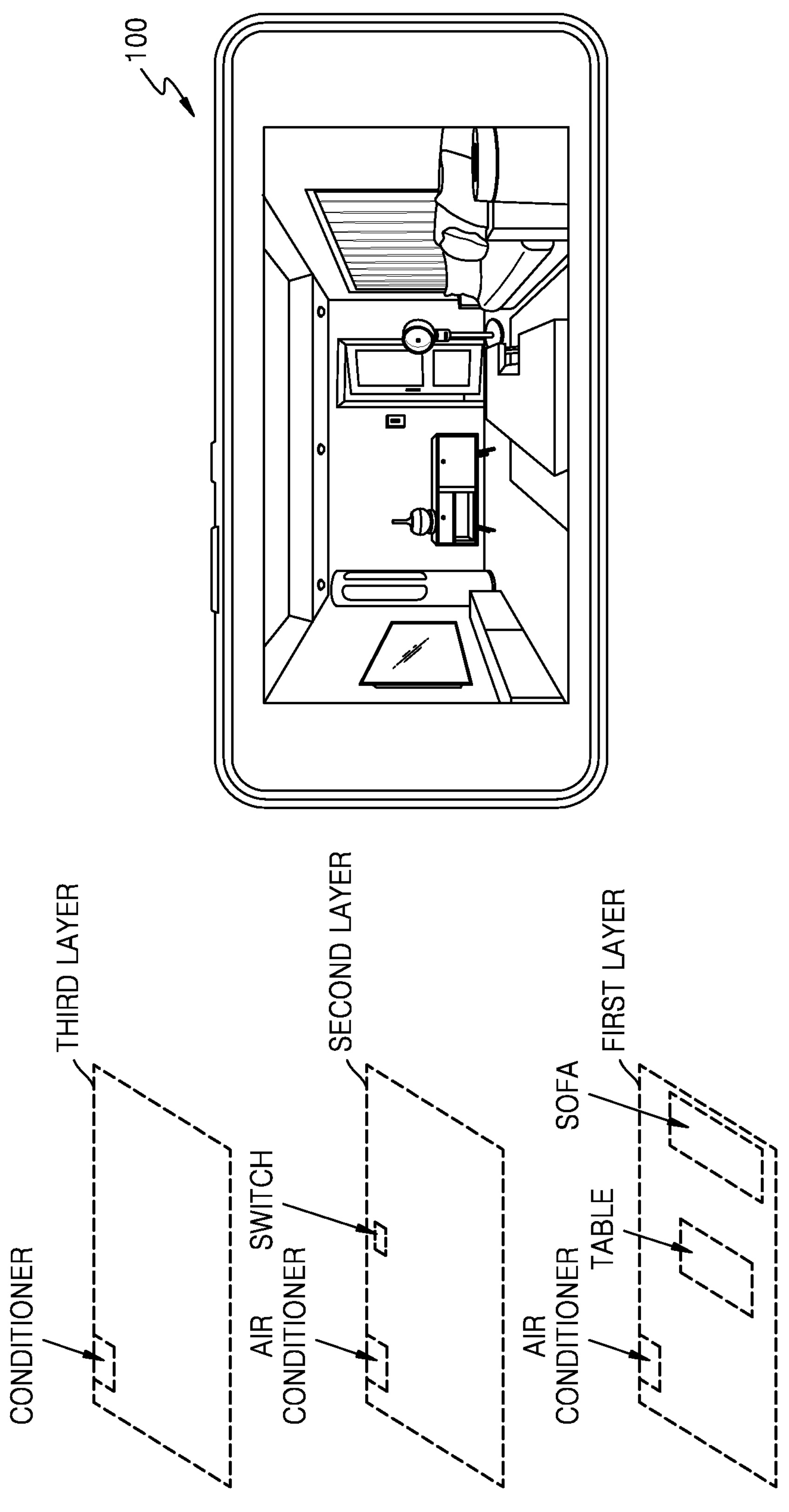
FIG. 13 is a diagram illustrating a method of displaying an indoor area, according to an embodiment of the disclosure.

FIG. 13 is a diagram illustrating a method of displaying an indoor area, according to an embodiment of the disclosure.

Referring to FIG. 13, a spatial map of a user's indoor area is illustrated. According to an embodiment of the disclosure, the spatial map of the user's indoor area may be a spatial map generated based on a height at which an object is located. A first layer of the spatial map may include an air conditioner, a table, and a sofa, which are in a lower portion of the area. A second layer of the spatial map may include the air conditioner and a switch, which are in an intermediate portion of the area. A third layer of the spatial map may include the air conditioner, which is in an upper portion of the area.

The electronic device 100 according to an embodiment of the disclosure may display the user's indoor area by using the spatial map. The spatial map may be previously generated by the electronic device 100 or be received from another device by electronic device 100. The electronic device 100 may render an image of the user's indoor area, based on the spatial map. The rendered image may include the air conditioner, the switch, the table, and the sofa, which are objects in the spatial map. The electronic device 100 may provide information about the user's indoor area to the user by displaying the rendered image.

Figure 14:
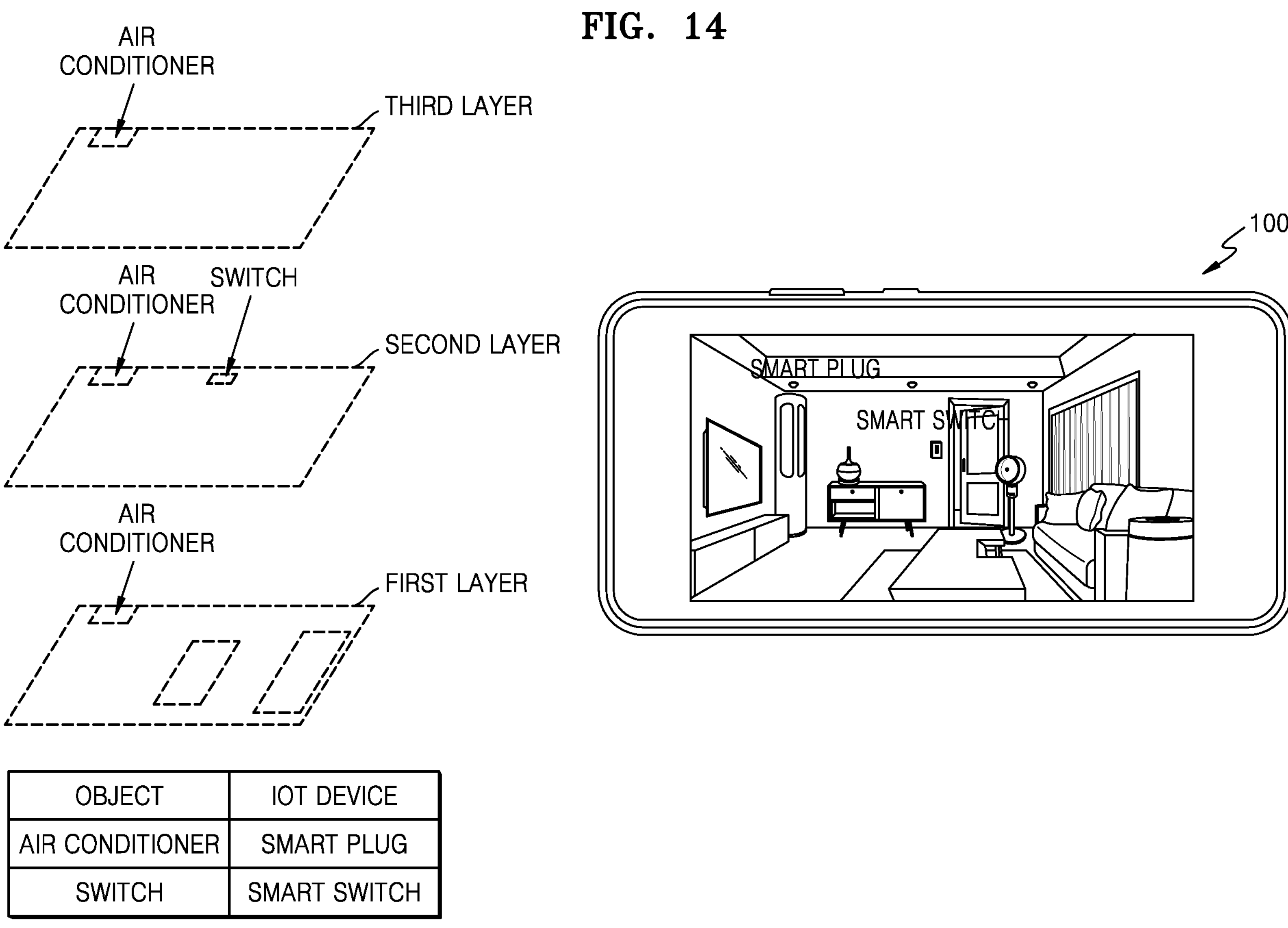
FIG. 14 is a diagram illustrating a method of displaying a recommended IoT device available in an indoor area, according to an embodiment of the disclosure.

FIG. 14 is a diagram illustrating a method displaying a recommended IoT device available in an indoor area, according to an embodiment of the disclosure.

Referring to FIG. 14, a spatial map of a user's indoor area and a table regarding IoT devices respectively corresponding to objects are illustrated. The electronic device 100 according to an embodiment of the disclosure may determine an IoT device corresponding to an object in the user's indoor area. For example, the electronic device 100 may determine IoT devices, which correspond to an air conditioner and a switch, to be a smart plug and a smart switch, respectively.

The electronic device 100 according to an embodiment of the disclosure may match information about the IoT device to correspond to the object in the spatial map of the user's indoor area. For example, the electronic device 100 may match a smart plug and a smart switch to respectively correspond to the IoT devices, which respectively correspond to the air conditioner and the switch in the spatial map.

The electronic device 100 according to an embodiment of the disclosure may provide information about an IoT device available in the user's indoor area, based on the spatial map and the information about the IoT device corresponding to the object. The electronic device 100 may generate a user's indoor area image by rendering the spatial map. The electronic device 100 may display the user's indoor area image and information about an IoT device corresponding to an object in the user's indoor area image. For example, the electronic device 100 may display a smart plug on an air conditioner of the user's indoor area image and display a smart switch on a switch of the user's indoor area image.

Figure 15:
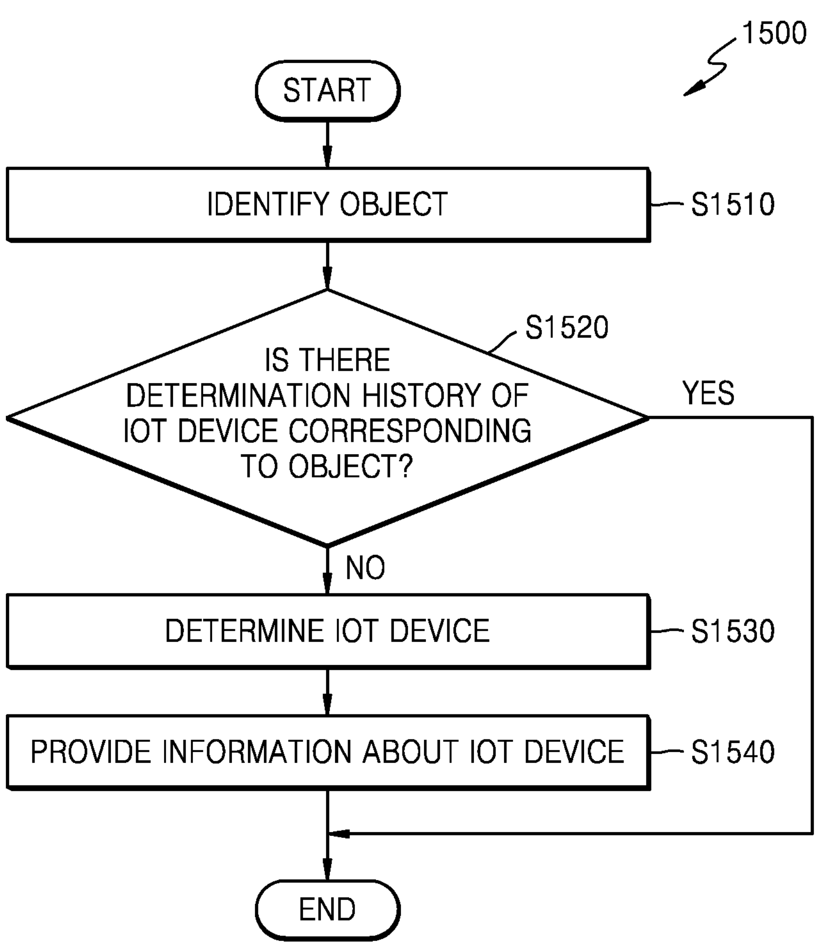
FIG. 15 is a flowchart illustrating a method of determining a recommended IoT device, according to an embodiment of the disclosure.

FIG. 15 is a flowchart illustrating a method of determining a recommended IoT device, according to an embodiment of the disclosure.

In operation S1510, the electronic device 100 may identify an object in a captured image. Operation S1510 may correspond to operation S210 of FIG. 2.

In operation S1520, the electronic device 100 may identify whether the electronic device 100 has ever determined an IoT device corresponding to the object. When the electronic device 100 has not done so, the method proceeds to operation S1530. When the electronic device 100 has done so, the method ends. The electronic device 100 according to an embodiment of the disclosure may identify an IoT device determination history stored therein and may determine whether the electronic device 100 has ever determined an IoT device for the object identified in operation S1510. The IoT device determination history may be present in the electronic device 100 or the server 700.

In operation S1530, the electronic device 100 may determine the IoT device corresponding to the object. Operation S1530 may correspond to operation S230 of FIG. 2. In operation S1540, the electronic device 100 may display the IoT device. Operation S1540 may correspond to operation S240 of FIG. 2.

Figure 16:
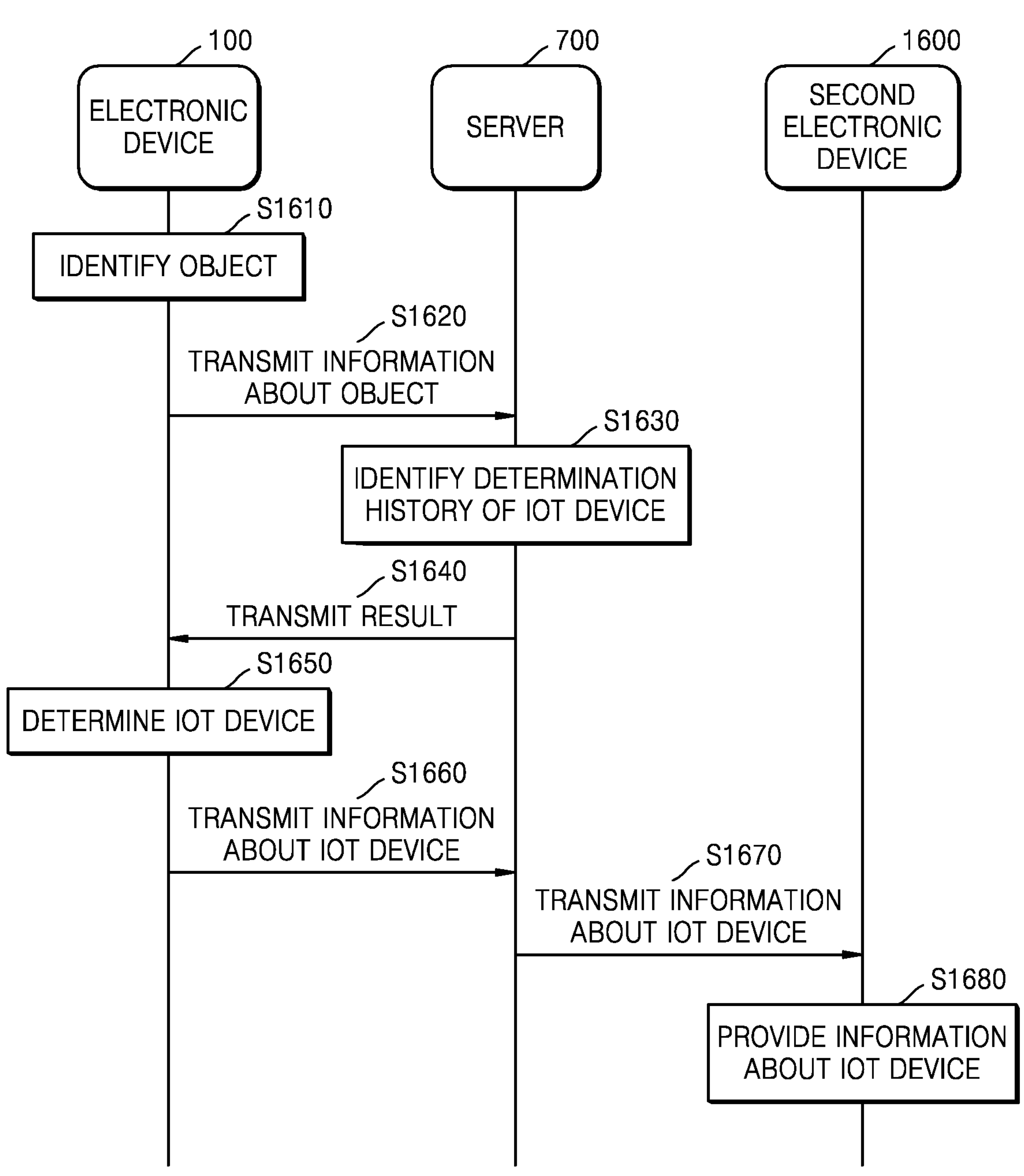
FIG. 16 is a sequence diagram illustrating a method of providing a recommended IoT device, according to an embodiment of the disclosure.

FIG. 16 is a sequence diagram illustrating a method of providing a recommended IoT device, according to an embodiment of the disclosure.

Referring to FIG. 16, the electronic device 100, the server 700, and a second electronic device 1600 may provide information about an IoT device. The electronic device 100 according to an embodiment of the disclosure may be an electronic device including a camera, and the second electronic device 1600 may be an electronic device including a display.

In operation S1610, the electronic device 100 may identify an object, based on a captured image. Operation S1610 may correspond to operation S210 of FIG. 2. In operation S1620, the electronic device 100 may transmit information about the identified object to the server 700. In operation S1630, the server 700 may identify an IoT device determination history. In operation S1640, the server 700 may transmit, to the electronic device 100, information about whether there is an IoT device determination history.

In operation S1650, the electronic device 100 may determine an IoT device corresponding to the object. The electronic device 100 may determine the IoT device, based on the result that there is no IoT device determination history. Operation S1650 may correspond to operation S230 of FIG. 2.

In operation S1660, the electronic device 100 may transmit information about the determined IoT device to the server 700. In operation S1670, the server 700 may transmit, to the second electronic device 1600, the information received from the electronic device 100. In operation S1680, the second electronic device 1600 may provide the received information about the IoT device. The second electronic device 1600 may provide information about only an IoT device having no IoT device determination history.

Figure 17:
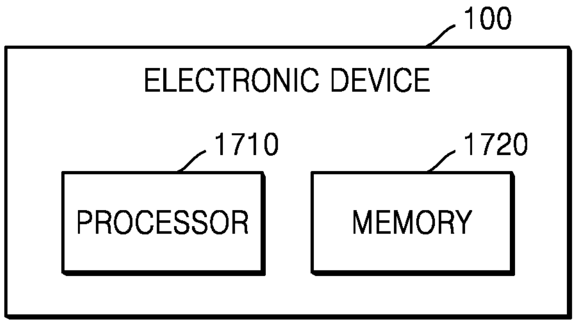
FIG. 17 is a block diagram illustrating an electronic device configured to provide a recommended IoT device, according to an embodiment of the disclosure.

FIG. 17 is a block diagram illustrating an electronic device that provides a recommended IoT device, according to an embodiment of the disclosure.

Referring to FIG. 17, although the electronic device 100 according to an embodiment of the disclosure may include a processor 1610 and a memory 1620, the disclosure is not limited thereto and the electronic device 100 may further include a general-purpose component.

The memory 1620 according to an embodiment of the disclosure may store a program for processing and control by the processor 1610 and may store data (for example, area information, object information, a spatial map, a movement path, and the like) that is input to the electronic device 100 or output from the electronic device 100. The memory 1620 may store therein instructions, data structures, and program code, which are readable by the processor 1610. In embodiments of the disclosure, operations performed by the processor 1610 may be implemented by executing instructions or pieces of code, which are stored in the memory 1620.

The memory 1620 according to an embodiment of the disclosure may include a flash memory type memory, a hard disk type memory, a multimedia card micro type memory, or a card type memory (for example, an SD or XD memory or the like) and may include non-volatile memory, which includes at least one of read-only memory (ROM), electrically erasable programmable read-only memory (EEPROM), magnetic memory, a magnetic disk, or an optical disk, and volatile memory, such as random access memory (RAM) or static random access memory (SRAM).

The memory 1620 according to an embodiment of the disclosure may store therein one or more instructions and/or programs for controlling the electronic device 100, which uses area information, to perform a task. For example, an area information management module, a task processing module, a driving module, and the like may be stored in the memory 1620.

The processor 1610 according to an embodiment of the disclosure may be configured to execute instructions or programmed software modules, which are stored in the memory 1620, and thus control operations or functions of the electronic device 100 to allow the electronic device 100 to perform a task. The processor 1610 may include a hardware component configured to perform arithmetic, logic, and input/output operations and signal processing. The processor 1610 may be configured to execute the one or more instructions stored in the memory 1620 to control overall operations of the electronic device 100, which performs a task by using the area information. The processor 1610 may be configured to execute the programs stored in the memory 1620 to control an input/output unit and a communication unit.

The processor 1610 according to an embodiment of the disclosure may include, but is not limited to, for example, at least one of a CPU, a microprocessor, a GPU, application specific integrated circuits (ASICs), digital signal processors (DSPs), digital signal processing devices (DSPDs), programmable logic devices (PLDs), field programmable gate arrays (FPGAs), an application processor, a neural processing unit, or an artificial intelligence-dedicated processor that is designed in a hardware structure specialized for processing an artificial intelligence model. Each processor constituting the processor 1610 may be a dedicated processor for performing a certain function.

An artificial intelligence (AI) processor according to an embodiment of the disclosure may be configured to perform, by using an AI model, calculations and control for processing of a task that is set for the electronic device 100 to perform. The AI processor may be fabricated in the form of a dedicated hardware chip for AI or may be fabricated as a portion of a general-purpose processor (for example, a CPU or an application processor) or a graphics-dedicated processor (for example, a GPU) and thus mounted in the electronic device 100.

According to an embodiment of the disclosure, the processor 1610 may be configured to execute the instructions stored in the memory 1620 to identify an object in a captured image of a user's indoor area. The processor 1610 may be configured to execute the instructions stored in the memory 1620 to identify a feature of the object, which is related to at least one operation method of the object or a configuration of the object, based on the captured image. The processor 1610 may be configured to execute the instructions stored in the memory 1620 to determine an IoT device corresponding to the object, based on the type of the object and the feature of the object. The processor 1610 may be configured to execute the instructions stored in the memory 1620 to provide information about the IoT device.

According to an embodiment of the disclosure, the processor 1610 may be configured to execute the instructions stored in the memory 1620 to input the captured image to a first neural network, and thereby obtain, as an output, at least one of information about the type of the object or information about the position of the object.

According to an embodiment of the disclosure, the processor 1610 may be configured to execute the instructions stored in the memory 1620 to obtain an image, which corresponds to the object, from the captured image. The processor 1610 may be configured to execute the instructions stored in the memory 1620 to input the image corresponding to the object to a second neural network to identify the feature of the object. The second neural network may be configured to take, as an input, an image including an object, and output information about a feature of the object in the image.

According to an embodiment of the disclosure, the processor 1610 may be configured to execute the instructions stored in the memory 1620 to obtain a spatial map of a user's indoor area. The processor 1610 may be configured to execute the instructions stored in the memory 1620 to identify the position of the object in the spatial map. The processor 1610 may be configured to execute the instructions stored in the memory 1620 to match the information about the IoT device to correspond to the object.

According to an embodiment of the disclosure, the processor 1610 may be configured to execute the instructions stored in the memory 1620 to generate an image of an area including the object, based on the spatial map. The processor 1610 may be configured to execute the instructions stored in the memory 1620 to display the image of the area. The processor 1610 may be configured to execute the instructions stored in the memory 1620 to display the information about the IoT device on the image of the area.

According to an embodiment of the disclosure, the processor 1610 may be configured to execute the instructions stored in the memory 1620 to identify whether the IoT device corresponding to the object has previously been determined. The processor 1610 may be configured to execute the instructions stored in the memory 1620 to provide the information about the IoT device, based on the IoT device corresponding to the object having not previously been determined.

According to an embodiment of the disclosure, the processor 1610 may be configured to execute the instructions stored in the memory 1620 to determine, as the IoT device, the IoT device having already been determined in correspondence with the type of the object and the feature of the object.

According to an embodiment of the disclosure, the processor 1610 may be configured to execute the instructions stored in the memory 1620 to identify indoor area feature information, which includes at least one of the color of the user's indoor area, the texture of the user's indoor area, or the type of the user's indoor area, from the captured image.

The electronic device 100 may further include an input/output unit and a communication unit in addition to the processor 1610 and the memory 1620.

The communication unit may include one or more components allowing the electronic device 100 to communicate with an external device, for example, a cloud server, IoT devices, or a user terminal. For example, the communication unit may include, but is not limited to, a short-range wireless communication unit, a mobile communication unit, or the like.

The short-range wireless communication unit may include, but is not limited to, a Bluetooth Low Energy (BLE) communication unit, a Near-Field communication unit, a Wireless LAN (WAN) communication unit, a Zigbee communication unit, an Ant+ communication unit, a Wi-Fi Direct (WFD) communication unit, an Ultra WideBand (UWB) communication unit, an infrared Data Association (IrDA) communication unit, a micro-wave (uWave) communication unit, or the like.

The mobile communication unit transmits radio signals to and receives radio signals from at least one of a base station, an external terminal, or a server on a mobile communication network. Here, the radio signal may include a voice call signal, a video call signal, or various types of data according to the transmission and reception of text/multimedia messages.

The input/output unit may include an input unit and an output unit. The input/output unit may be of a type in which an input unit and an output unit are separated from each other, or a type in which an input unit and an output unit are integrated, such as a touchscreen. The input/output unit may receive input information from a user and may provide output information to the user.

The input unit may refer to a means of inputting data for the user to control the electronic device 100. For example, the input unit may include a keypad, a touch panel (a touch capacitive type, a pressure resistive type, an infrared beam sensing type, a surface acoustic wave type, an integral strain gauge type, a piezoelectric type, or the like), or the like. In addition, the input unit may include, but is not limited to, a jog wheel, a jog switch, or the like.

The output unit may output an audio signal, a video signal, or a vibration signal, and the output unit may include a display unit.

The display unit may display information processed by the electronic device 100. For example, the display unit may display a user interface for receiving a manipulation of the user. When the display unit and a touch pad form a layer structure and thus constitute a touchscreen, the display unit may also be used as an input device in addition to being used as an output device. The display unit may include at least one of a liquid crystal display, a thin film transistor-liquid crystal display, an organic light-emitting diode, a flexible display, or a three-dimensional (3D) display. The electronic device 100 may include two or more display units, depending on implementation types of the electronic device 100.

According to an embodiment of the disclosure, a method of providing information about an Internet-of-Things (IoT) device available in an indoor area is provided. The method may include identifying an object in a captured image of the indoor area. The method may include identifying a feature of the object based on the captured image. The feature may be related to at least one operation method of the object or a configuration of the object. The method may include determining an IoT device corresponding to the object, based on a type of the object and the feature of the object. The method may include providing information about the determined IoT device.

According to an embodiment of the disclosure, the method may include the identifying the object comprises inputting the captured image to a first artificial intelligence model. The method may include obtaining, as an output, at least one of information about the type of the object or information about a position of the object. The first artificial intelligence model may be trained to identify the type of the object and the position of the object.

According to an embodiment of the disclosure, the identifying the feature of the object may include obtaining, from the captured image, an image which corresponds to the object. The method may include inputting the image to a second artificial intelligence model to identify the feature of the object. The second artificial intelligence model is configured to take, as an input, the image corresponding to the object, and output information about the feature of the object in the image.

According to an embodiment of the disclosure, the method may include determining, from among a plurality of neural networks, the second artificial intelligence model to be a neural network related to the type of the object.

According to an embodiment of the disclosure, the method may include obtaining a spatial map of the indoor area. The method may include identifying a position of the object in the spatial map. The method may include matching the information about the IoT device with the object.

According to an embodiment of the disclosure, the providing the information about the determined IoT device may include generating an image of the indoor area including the object, based on the spatial map. the providing the information about the determined IoT device may include displaying the image of the indoor area. the providing the information about the determined IoT device may include displaying the information about the determined IoT device on the image of the indoor area.

According to an embodiment of the disclosure, the method may include identifying whether the IoT device has previously been determined for the object. The providing the information about the determined IoT device may include providing the information about the determined IoT device, based on the IoT device having not previously been determined for the object.

According to an embodiment of the disclosure, the determining the IoT device may include determining, as the IoT device, an IoT device that has already been determined, in correspondence with the type of the object and the feature of the object.

According to an embodiment of the disclosure, the method may include identifying, from the captured image, indoor area feature information comprising at least one of a color of the indoor area, a texture of the indoor area, or a type of the indoor area. The method may include determining the IoT device based on the indoor area feature information.

According to an embodiment of the disclosure, the object may include at least one of a device or equipment. The device may include at least one of a switch, an electrical outlet, a remote control, a television, or an air conditioner. The equipment may include at least one of a curtain or a table. The feature of the object may include at least one of a number of components in the object, an arrangement of the components, a pose of each of the components, or a movement direction of each of the components.

According to an embodiment, a computer-readable recording medium having stored thereon a program to perform the method is provided.

According to an embodiment of the disclosure, an electronic device configured to provide information about an Internet-of-Things (IoT) device available in an indoor area is provided. The electronic device may include at least one processor; and a memory storing at least one instruction. The at least one processor may be configured to execute the at least one instruction to identify an object in a captured image of the indoor area. The at least one processor may be configured to execute the at least one instruction to identify a feature of the object based on the captured image, the feature being related to at least one operation method of the object or a configuration of the object. The at least one processor may be configured to execute the at least one instruction to determine an IoT device corresponding to the object, based on a type of the object and the feature of the object. The at least one processor may be configured to execute the at least one instruction to provide information about the determined IoT device.

According to an embodiment of the disclosure, the at least one processor may be configured to execute the at least one instruction to input the captured image to a first artificial intelligence model. The at least one processor may be configured to execute the at least one instruction to obtain, as an output, at least one of information about the type of the object or information about a position of the object. The first artificial intelligence model may be trained to identify the type and the position of the object.

According to an embodiment of the disclosure, the at least one processor may be configured to execute the at least one instruction to obtain, from the captured image, an image corresponding to the object. The at least one processor may be configured to execute the at least one instruction to input the image corresponding to the object to a second artificial intelligence model to identify the feature of the object. The second artificial intelligence model may be configured to take, as an input, the image corresponding to the object, and may be configured to output information about the feature of the object in the image.

According to an embodiment of the disclosure, the at least one processor may be configured to execute the at least one instruction to determine, from among a plurality of neural networks, the second artificial intelligence model to be a neural network related to the type of the object.

According to an embodiment of the disclosure, the at least one processor may be configured to execute the at least one instruction to obtain a spatial map of the indoor area. The at least one processor may be configured to execute the at least one instruction to identify a position of the object in the spatial map. The at least one processor may be configured to execute the at least one instruction to match the information about the IoT device with the object.

According to an embodiment of the disclosure, the at least one processor may be configured to execute the at least one instruction to generate an image of the indoor area including the object, based on the spatial map. The at least one processor may be configured to execute the at least one instruction to display the image of the indoor area. The at least one processor may be configured to execute the at least one instruction to display the information about the determined IoT device on the image of the indoor area.

According to an embodiment of the disclosure, the at least one processor may be configured to execute the at least one instruction to identify whether the IoT device has previously been determined for the object. The at least one processor may be configured to execute the at least one instruction to provide the information about the determined IoT device, based on the IoT device having not previously been determined for the object.

According to an embodiment of the disclosure, The at least one processor may be configured to execute the at least one instruction to determine, as the IoT device, an IoT device that has already been determined, in correspondence with the type of the object and the feature of the object.

According to an embodiment of the disclosure, The at least one processor may be configured to execute the at least one instruction to identify, from the captured image, indoor area feature information comprising at least one of a color of the indoor area, a texture of the indoor area, or a type of the indoor area. The at least one processor may be configured to execute the at least one instruction to determine the IoT device based on the indoor area feature information.

According to an embodiment of the disclosure, the object may include at least one of a device or equipment. The device may include at least one of a switch, an electrical outlet, a remote control, a television, or an air conditioner. The equipment may include at least one of a curtain or a table. The feature of the object may include at least one of a number of components in the object, an arrangement of the components, a pose of each of the components, or a movement direction of each of the components.

A machine-readable storage medium may be provided in the form of a non-transitory storage medium. Herein, the term "non-transitory storage medium" only means that a storage medium is tangible and does not include signals (for example, electromagnetic waves), whether data is semi-permanently or temporarily stored in the storage medium. For example, a "non-transitory storage medium" may include a buffer in which data is temporarily stored.

According to an embodiment of the disclosure, a method according to various embodiments of the disclosure may be provided while included in a computer program product. The computer program product may be traded as merchandise between a seller and a purchaser. The computer program product may be distributed in the form of a machine-readable storage medium (for example, compact disc read-only memory (CD-ROM)) or may be distributed (for example, downloaded or uploaded) on-line through an application store or directly between two user devices (for example, smartphones). In the case of on-line distribution, at least a portion of the computer program product (for example, a downloadable app) may be at least temporarily stored or temporarily generated in a machine-readable storage medium, such as a memory of a server of a manufacturer, of a server of an application store, or of a relay server.

What is claimed is:

1. A method performed by an electronic device for of providing information about an Internet-of-Things (IoT) device available in an indoor area, the method comprising:

identifying an object in a captured image of the indoor area;

identifying a feature of the object based on the captured image, the feature being related to at least one operation method of the object or a configuration of the object, wherein the feature of the object comprises at least one of: a number of components in the object, an arrangement of the components, a pose of each of the components, or a movement direction of each of the components;

determining an IoT device corresponding to the object, based on a type of the object and the feature of the object;

providing information about the determined IoT device, the information about the determined IoT device being stored in the electronic device;

obtaining a spatial map of the indoor area;

identifying a position of the object in the spatial map;

matching the information about the IoT device with the object;

generating an image of the indoor area including the object, based on the spatial map;

displaying the image of the indoor area; and displaying the information about the determined IoT device on the image of the indoor area, wherein the identifying the object comprises inputting the captured image to a first artificial intelligence model, and obtaining, as an output, at least one of information about the type of the object or information about the position of the object, and wherein the first artificial intelligence model is trained to identify the type of the object and the position of the object.

2. The method of claim 1, wherein the identifying the feature of the object comprises:

obtaining, from the captured image, an image which corresponds to the object; and inputting the image to a second artificial intelligence model to identify the feature of the object, and wherein the second artificial intelligence model is configured to take, as an input, the image corresponding to the object, and output information about the feature of the object in the image.

3. The method of claim 2, further comprising determining, from among a plurality of neural networks, the second artificial intelligence model to be a neural network related to the type of the object.

4. The method of claim 1, further comprising identifying whether the IoT device has previously been determined for the object, and wherein the providing the information about the determined IoT device comprises providing the information about the determined IoT device, based on the IoT device having not previously been determined for the object.

5. The method of claim 4, wherein the determining the IoT device comprises determining, as the IoT device, an IoT device that has already been determined, in correspondence with the type of the object and the feature of the object.

6. The method of claim 5, further comprising:

identifying, from the captured image, indoor area feature information comprising at least one of a color of the indoor area, a texture of the indoor area, or a type of the indoor area, and determining the IoT device based on the indoor area feature information.

7. The method of claim 6, wherein the object comprises at least one of a device or equipment, wherein the device comprises at least one of a switch, an electrical outlet, a remote control, a television, or an air conditioner, and wherein the equipment comprises at least one of a curtain or a table.

8. An electronic device configured to provide information about an Internet-of-Things (IoT) device available in an indoor area, the electronic device comprising:

at least one processor; and a memory storing at least one instruction, wherein the at least one processor is configured to execute the at least one instruction to:

identify an object in a captured image of the indoor area;

identify a feature of the object based on the captured image, the feature being related to at least one operation method of the object or a configuration of the object; object, wherein the feature of the object comprises at least one of: a number of components in the object, an arrangement of the components, a pose of each of the components, or a movement direction of each of the components;

determine an IoT device corresponding to the object, based on a type of the object and the feature of the object;

provide information about the determined IoT device, the information about the determined IoT device being stored in the electronic device;

obtain a spatial map of the indoor area;

identify a position of the object in the spatial map;

match the information about the IoT device with the object;

generate an image of the indoor area including the object, based on the spatial map;

display the image of the indoor area; and display the information about the determined IoT device on the image of the indoor area, wherein the at least one processor is further configured to execute the at least one instruction to:

input the captured image to a first artificial intelligence model, obtain, as an output, at least one of information about the type of the object or information about the position of the object, and wherein the first artificial intelligence model is trained to identify the type and the position of the object.

9. The electronic device of claim 8, wherein the at least one processor is further configured to execute the at least one instruction to:

obtain, from the captured image, an image corresponding to the object; and input the image corresponding to the object to a second artificial intelligence model to identify the feature of the object, and wherein the second artificial intelligence model is configured to take, as an input, the image corresponding to the object, and is configured to output information about the feature of the object in the image.

10. The electronic device of claim 9, wherein the at least one processor is further configured to execute the at least one instruction to determine, from among a plurality of neural networks, the second artificial intelligence model to be a neural network related to the type of the object.

11. A non-transitory computer-readable recording medium having stored thereon a program to perform the method of claim 1.

* * * * *